United States Patent [19]

Terman et al.

[11] Patent Number: 5,589,741
[45] Date of Patent: Dec. 31, 1996

[54] SYSTEM FOR CREATING NATURALISTIC ILLUMINATION CYCLES

[75] Inventors: Michael Terman; Stephen Fairhurst, both of New York, N.Y.; Phlip Hughes, Lake Hopatcong, N.J.; Joel Levitt, Brooklyn, N.Y.

[73] Assignees: Research Foundation For Mental Hygiene, Inc., Albany, N.Y.; Medic-Light Inc., Lake Hopatcong, N.J.

[21] Appl. No.: 229,533

[22] Filed: Apr. 19, 1994

Related U.S. Application Data

[63] Continuation-in-part of Ser. No. 52,044, Apr. 22, 1993, abandoned.
[51] Int. Cl.$^6$ .................................................. H05B 37/02
[52] U.S. Cl. .......................... 315/360; 315/292; 315/156; 315/159
[58] Field of Search ................................ 315/153, 360, 315/307, 292, 158, 156, 159

[56] References Cited

U.S. PATENT DOCUMENTS 4,095,139  6/1978  Symonds et al. ..................... 315/153
5,160,853  11/1992  Simon et al. ......................... 315/360
5,343,121  8/1994  Terman et al. ....................... 315/158

*Primary Examiner*—Robert Pascal
*Assistant Examiner*—Michael Shingleton

[57] ABSTRACT

A naturalistic illumination system for a user at a location having a light source for providing illumination of variable intensity above a non-zero value to the user location. A computer produces a variable signal to control a cycle of variable intensity illumination level output of the light source to correspond to the progressive variation in light level intensity above a non-zero value over a selected time of day period at a geographical location as selected from a computer input device. The variable signal is produced on a daily basis to produce the variable intensity illumination cycle for the same period of time in a manner to progressively shift the time of the start of the production of the variable intensity illumination cycle for the period of time each day over a period of successive days relative to the normal time of start of the production of the variable intensity illumination cycle during the period of successive days at the selected geographical location. The variable signal also can be produced to shift the time of start of the variable intensity illumination cycle for each day and to cause a dawn to dusk or dusk to dawn transition of the illumination cycle transition.

18 Claims, 25 Drawing Sheets

FIG. 2

| SELECTION | SPECIFY | LATITUDE | REFERENCE DATE | PROGRESSION | PORTION OF CYCLE | SUNRISE TIME | SUNSET TIME | SLEEP DURATION | MOONLIGHT | PROFILE SCHEMATIC |
|---|---|---|---|---|---|---|---|---|---|---|
| "WAKE ME UP" | SUNRISE TIME | 0° | 21 MARCH | REPEAT DATE | DAWN + 1 hr | SPECIFY | NONE | N/A | NONE | 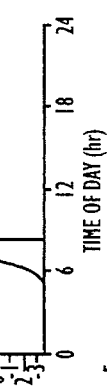 |
| "PUT ME TO SLEEP" | SUNSET TIME | 0° | 21 MARCH | REPEAT DATE | 1 hr + DUSK | NONE | SPECIFY | N/A | NONE |  |
| "SURROUND MY SLEEP" | SUNRISE TIME | 0° | 21 MARCH | REPEAT DATE | DAWN + 1 hr 1 hr + DUSK | SPECIFY | SUNRISE - (SLEEP DURATION + 20 min) | SPECIFY | NONE |  |
| "LIGHT OUTDOORS" | LOCAL LATITUDE, LONGITUDE, DIFF BET LOCAL TIME AND GMT (hr) | SPECIFY | CURRENT | CALENDAR | 24 hrs | CURRENT | CURRENT | N/A | YES | 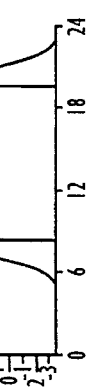 EXAMPLE (MOON) |
| "A LONG SUMMER DAY" | DIFF BET LOCAL TIME AND GMT (hr) | 45° | 21 JUNE | REPEAT DATE | 24 hrs | 4:13 a.m. (STD TIME) | 7:50 p.m. (STD TIME) | N/A | NONE |  |

SYSTEM FOR CREATING NATURALISTIC ILLUMINATION CYCLES

RELATED APPLICATION

This application is a continuation-in-part of our prior application, Ser. No. 08/052,044, filed Apr. 22, 1993 ABN.

BACKGROUND OF THE INVENTION

Pending patent application (Ser. No. 06/916,872, "Naturalistic Illumination System" M Terman, B Perlman, and S Fairhurst) describes a system and method that accurately specifies and reproduces outdoor illumination level as a continuous function of time, at any geographic location (latitude, longitude) and at any day of the year. Functional components of the synthesized signal needed to produce the varying illumination levels are direct sunlight, diffuse sky light, moonlight, and starlight. This method and system of that application provides a comprehensive account of naturalistic lighting cycles on the earth's surface.

The computer in the method and system of the foregoing application uses an algorithm which permits creation of said naturalistic illumination cycles by artificial means in remotely positioned environments and at all times of year, or at a proximal environment at a contrasting time of year. Attenuation of maximal outdoor illumination levels by varying degrees of cloud cover is also accommodated. Thus, the prior method and system can be used to present all or part of a naturalistic daily illumination cycle in, for example, a darkened bedroom, an underground living/working environment, a submarine or spacecraft, a light-isolated industrial building or hospital, or an animal care, animal husbandry or fisheries installation. The moonlight producing aspect of said prior method and apparatus has potential application as a bedroom lighting supplement that may control the timing of female hormonal cycles.

Such artificially created light cycles can be used to create a continuously illuminated environment including modulated daylight levels, dawn and dusk light levels spanning civil, nautical, and astronomical twilight ranges, moonlight levels (as a function of lunar phase), and starlight levels (defined as the lowest level of naturally occurring outdoor light, close to darkness). For particular applications, specific components of the continuous 24-hour cycle can be utilized, such as dawn and/or dusk twilight signals, moonlight signal, or daylight signal (sun above horizon), leaving the remaining intervals of the day illuminated at constant arbitrary levels, at spontaneously occurring local levels, or in darkness.

The prior method and apparatus can also be used to specify lighting cycles that deviate from naturally-occurring cycles in specific parameters, such as periodicity (non-24-hour cycles), as may be needed for specific applications. For example, the cycle period can be matched to the intrinsic circadian rhythm of an organism (for example, 25 hr for a human), for investigations of circadian rhythm entrainment outside the confines of the solar day. As a second example, it can move the illumination pattern across latitudes, longitudes, and/or times of the year in gradual or sudden steps. Thus, a traveler could accommodate to lighting conditions at a remote location in preparation for transmeridional flight, as a jet-lag countermeasure; a person adversely affected by the photic consequences of sudden shifts in local clock time in fall and spring could be exposed over successive light cycles to gradually shifted dawn and dusk signals, smoothing the abrupt transition; a person living under adverse winter-time lighting conditions at northerly latitude, could be shifted in stages toward simulated conditions at a more southerly latitude; or a person undergoing night shift work rotation could delay the phase of the dawn signal to late afternoon in preparation for arising after daytime sleep.

BRIEF DESCRIPTION OF THE INVENTION

The present invention describes an improvement of the foregoing method and system for (1) specifying desired naturalistic lighting parameters that modulate light delivery continuously in time, (2) interfacing a computer operated system and its software with calibrated lamp-drivers, (3) determining a precise relationship between digitally-coded lamp-driver signals and obtained illuminance using a variety of lamp types, and (4) detecting lamp failure during a run without influencing light output.

In accordance with the present invention, a method and system provide for user-selection of desired lighting parameters, on-line calculation of successive illumination levels, and digital mapping of illumination level for outputting to a specific lamp or lamp type. The system can be operated continuously in the background, permitting independent foreground uses of the computer. In alternative versions of the system, a subset of selections is provided, facilitating uses of the system (for example, as a stand-alone mini-microprocessor-based home bedroom device) that do not require flexible manipulation of parameters (for example, non-24-hour cycles), or a dedicated microcomputer.

BRIEF DESCRIPTION OF THE DRAWINGS

The invention will be described with reference to the following specification and annexed drawings in which.

DETAILED DESCRIPTION OF THE INVENTION

Figure 1:
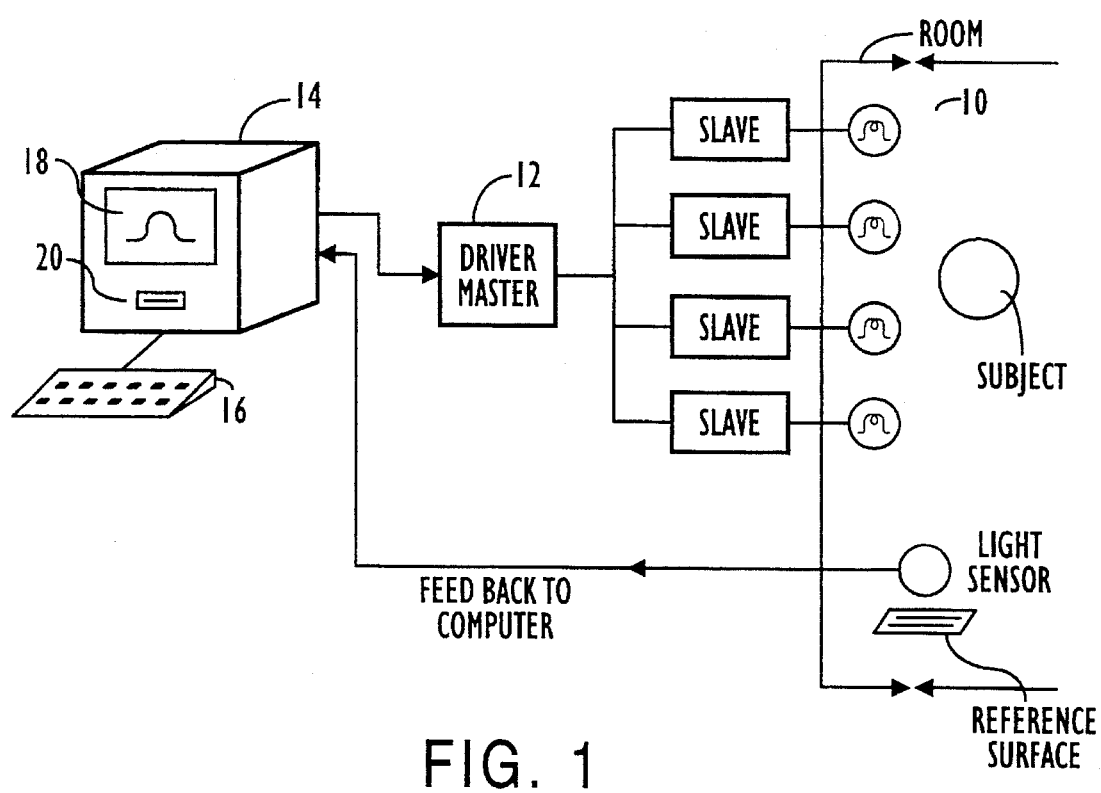
FIG. 1 is a schematic block diagram of the system.

Referring to FIG. 1, the system includes a light source 10, which can be incandescent or fluorescent or other types of lamp for producing a visible light output, which are operated by a driver 12, which controls the intensity of the light output of the lamp(s). Specific driver circuits are described below. The driver 12 is under the control of a computer 14 which has the usual keyboard 16 for user input and a display 18 with which the user interacts. Computer 14 can be, for example, a stand-alone personal computer, preferably of high computational capacity microprocessors, e.g., 30486 by Intel, 80830 by Motorola, RISC 4000 by MIPS, etc. Of course, a mini-computer or mainframe computer also can be used. As shown, the computer 14 has a disc drive 20 into which the computer program for controlling the driver 12 can be loaded. The program is capable of performing the functions described below, as selected by the user, and in response to data entries required of the user.

The computer program has two entries into the system, depending on user needs. First, Quick Select, in which a set of, for example five,. standard daily light-dark profiles can be initialized without specification of multiple parameters (FIG. 2). This option allows presentation of commonly utilized illumination profiles without requiring the user's detailed knowledge or manipulation of the system. For example, by selecting the "Wake me up" option, an equatorial dawn illumination profile is presented, and the user specifies only the desired time of sunrise. As a second example, by selecting "A long summer day", a full 24-hr profile is presented corresponding to the summer solstice at 45 deg N latitude, and the user specifies only the difference in hr between local time and Greenwich Mean Time (GMT). The user must also specify lamp type and serial port for the illumination output signal.

Second, the user can select Custom Profile, in which the user specifies the properties of a desired illumination profile by inputting critical algorithm parameters by menu selection. The domain of parameters includes.

start date of the run; start time;

latitude and longitude;

clock time difference from GMT;

selection of sunlight and/or moonlight signal;

calendar progression or repeated date;

desired sleep duration; selection of continuous illumination, dawn+dusk signals, dawn or dusk signal only;

days to be skipped (no light signal);

enabling of audio signals timed to dusk and/or dawn;

duration of light before dusk and after dawn;

proportional attenuation from the maximum output signal (full cycle or dusk and/or dawn);

minimum level of light output allowable (>0 lux);

constant or variable cloudiness factor;

presentation of light signal according to natural clock time or with phase shift relative to natural clock time;

phase shift of illumination cycle across clock-time transitions (gradual or sudden);

phase shift across geographic locations (gradual or sudden);

continuous variation of simulated geographic location;

arbitrary positioning of dawn and dusk "pulses"; and non-24-hr light cycle period.

These parameters, and their interaction, are explained below in context of the program's menu structure (Light Pattern, Regimen, Exposure, and Time Link).

Figure 3:
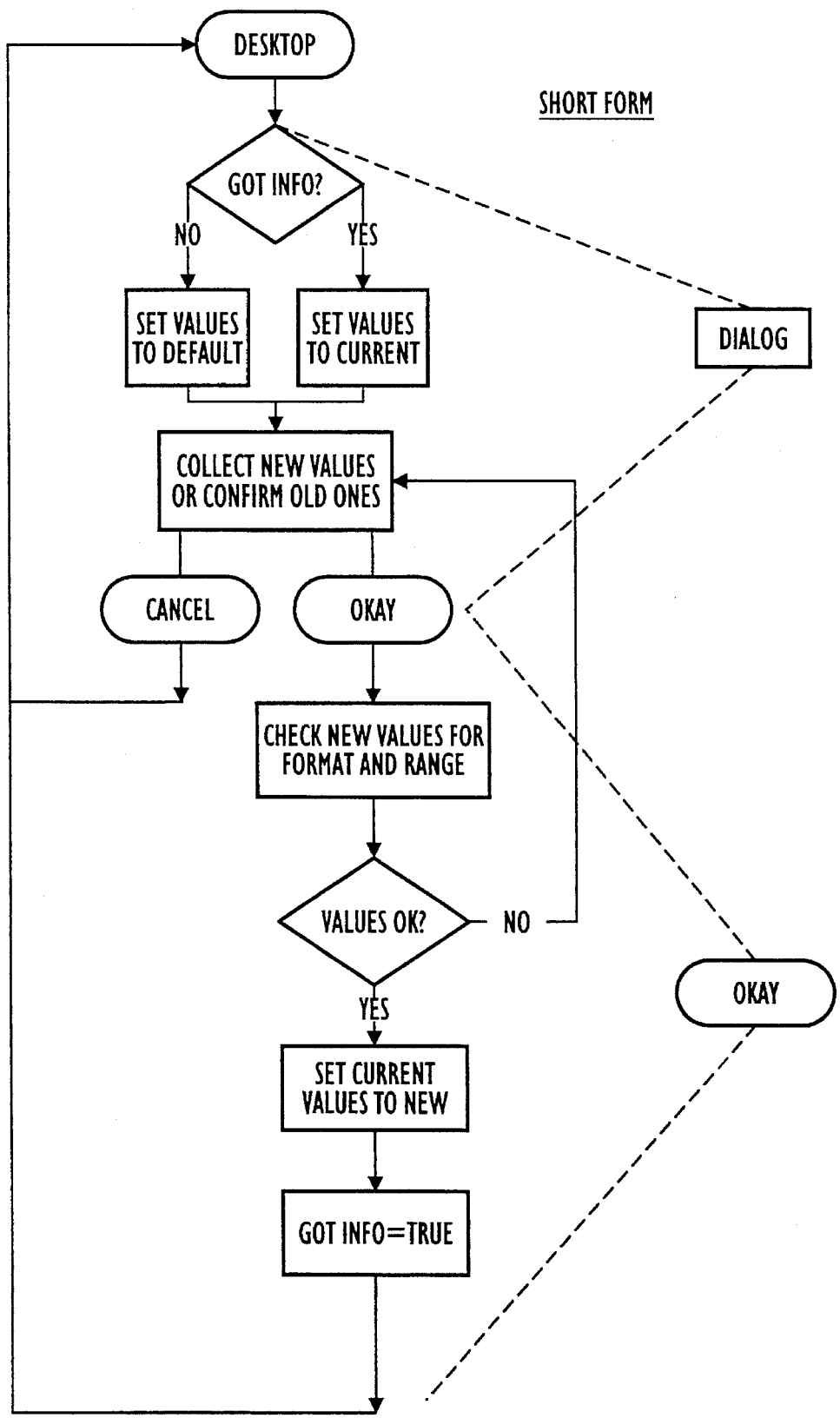
FIG. 3 is a flow chart showing the dialog aspect of data and program control entry for the system.

FIG. 3 is a flow chart which shows the dialog aspect of the program, for the Custom Profile entry. It reads all parameter entries made by the user, checks that each is valid (form, range), traps errors and loops back for re-entering. A display-based dialog is available for customizing the lighting pattern within the domain of the system. At each step the program confirms that a given parameter Selection is compatible ("OK") with the all other concurrently selected parameters. If not, an error message and help screen are provided, with loop back to data entry. User defined parameter sets can be saved as files within a library.

I. READ SETTINGS MODE

Figure 4:
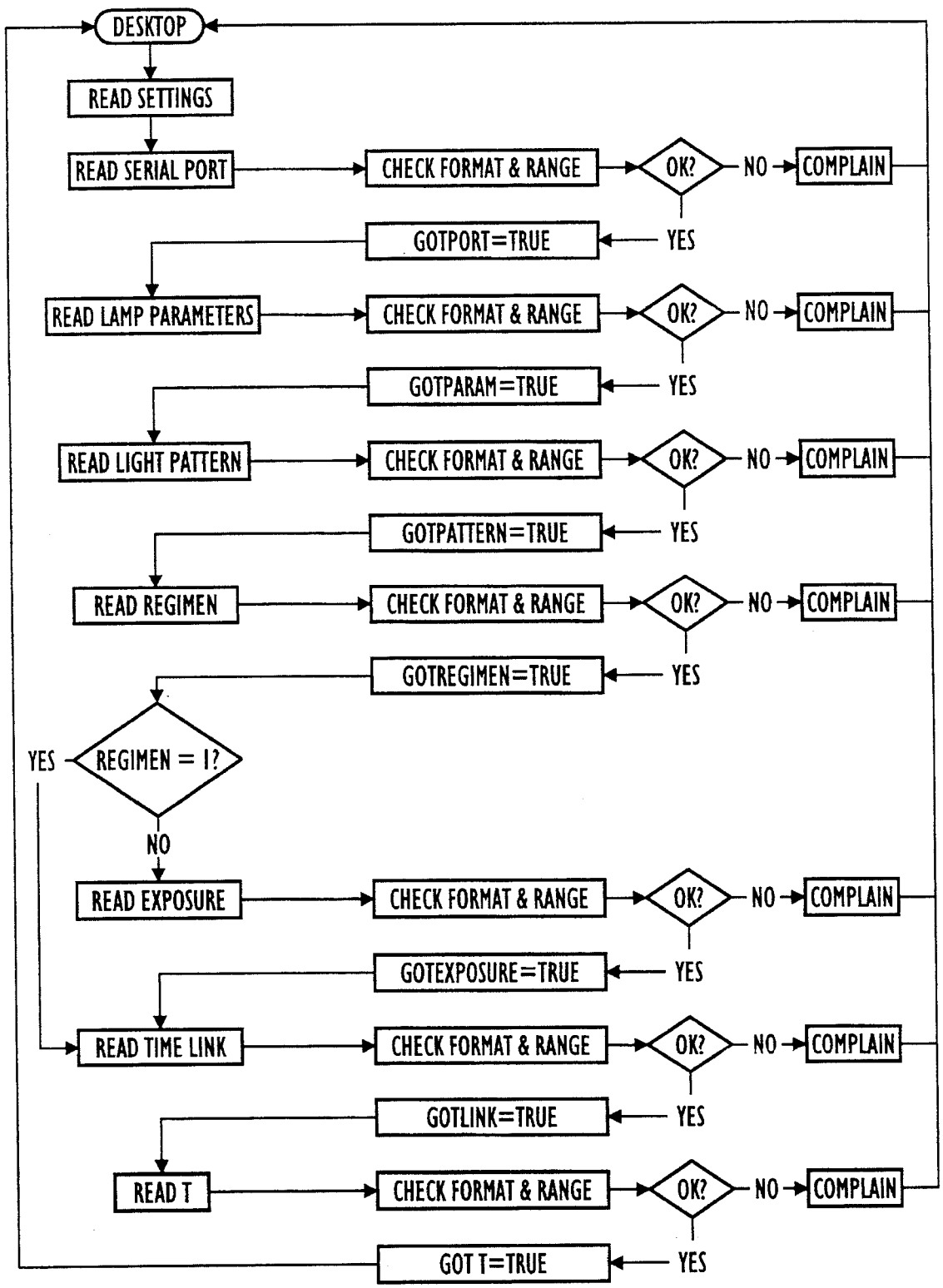
FIG. 4 is a flow chart for the READ SETTINGS MODE.

FIG. 4 illustrates the protocol by which the computer program checks for valid parameter entries, i.e., user-selected settings.

A. SERIAL PORT MENU. The user specifies which serial port is used to drive lamp interface module (printer, modem). For expanded uses, the output of the program can also be directed to serial expansion ports (e.g., AEC's QuadraLink™) to allow simultaneous delivery of the signal to multiple remote locations, or, via multi-tasking, different signals at different locations.

B. LAMP PARAMETERS MENU. The user specifies which of a set of calibrated lamp types is being used (for example, 500-w halogen, 150-w tungsten filament).

C. LIGHT PATTERN MENU. The user specifies the start date (day, mo, yr), start time (hr, min), latitude (numerical or major-cities list), longitude, clock time difference from GET (numerical or major-cities list), whether the illumination signal is to be comprised of sunlight signal and/or moonlight components, and choice of a calendar progression or repeated date for the illumination sequence across days. This has the following sub-menus.

C.i. SLEEP DURATION MENU. The user specifies, via keyboard entry, whether dawn and dusk transitions should be timed for a desired sleep duration. The user also specifies the duration (hr, min) and desired wake-up time. Using this option, the program finds a latitude (for example, at the summer solstice) at which the interval between a starting point post-sunset (for example, 20 min) and the moment of sunrise equals the specified sleep duration ("natural summer night" between 4–11 hr). Relevant parameters in all other dialogues are set accordingly by the computer program. The program acts so that the display returns the computed times of sunset (bedtime) and expected sleep onset. The user adjusts the duration parameter over days, homing in on a lighting pattern that supports the desired sleep phase and duration.

The user can indirectly (but quickly, by keyboard entries) select a naturalistic dawn and dusk profile (latitude, day of year) that surrounds the desired sleep episode with a dusk signal (which begins, e.g., 20 min before expected sleep onset) and a dawn signal (with the expected moment of arising synchronized with the dawn signal, e.g., at sunrise), by specifying (1) the desired time of arising, and (2) the desired duration of sleep. In response to these user inputs, the computer selects a latitude and day of year (e.g., 51.75 deg N lat on 21 June, for a desired 7-hour sleep duration), and anchors the simulated moment of sunrise to, for example, 7.30 AM.

C.ii. MANUAL DUSK/DAWN TRIGGER MENU. This feature enables an on-line key press entry (or input via remote control signal) to initiate a dusk signal, starting at sunset, at spontaneously variable bedtimes. The user specifies whether the dawn signal is to be presented at a fixed interval later ("sleep duration option"), or at a constant time of day ("workday option"). Using the workday option, the dawn signal always takes precedence over the dusk signal if the spontaneously triggered dusk interval overlaps it in time. When triggering a dusk-onset manually, the user selects a naturalistic (for example, equatorial) or accelerated (1–45 min) fade. The accelerated fade, while not naturalistic in its rapid time course, is a scaled compression of the standard fade (for example, equatorial), and retains its wave form.

The user can manually initiate a dusk signal at any desired time in order to facilitate sleep onset. Such dusk signal can assume a naturalistic or accelerated time course, depending on the user's scheduling needs. Accelerated time course would be constituted of a scalar compression of the naturalistic signal, for example, from two hr to 30 min. (45 min is the shortest naturalistic time course, at the equator; accelerated fades could occur across 1–45 min time spans.) It is possible that the direct hypnotic effect of light fades could be maintained with such rapid transition. The dawn transition can follow a manually-triggered dusk fade which can be set to (a) a standard time of awakening regardless of the time of the dusk fade, or (b) a fixed interval after the dusk fade, ensuring a constant dark interval for sleep which occurs at different times across days (e.g., 11 PM–7 AM on some days, 2 PM–10 AM on other days).

Use of these features overrides the regularly scheduled dusk transition on that day.

A manual dawn trigger can be selected whereby a user who awakens before (or after) a scheduled dawn transition can manually trigger a naturalistic or accelerated dawn fade in order to facilitate awakening with maximal alertness. Use of this feature overrides the regularly scheduled dawn transition on that day.

C.iii. MANUAL DUSK/DAWN ABORT MENU. This feature enables an on-line key press entry (or input via remote control signal) that aborts the next dusk fade or one already in progress, extinguishing the lamp until the next dawn fade is scheduled. It allows for immediate transition to darkness ("dusk escape" option) without interrupting the program or affecting the timing of upcoming illumination cycles.

The user also can cancel the next scheduled dusk fade, in order to go to sleep in a darkened room at an earlier or later interval than specified by the normal program, without use of a dusk signal. (For example, individual becomes sleepy at 9 PM, although dusk fade is scheduled for 11 PM, and so individual cancels that evening's dusk fade and goes to sleep in a darkened room at 9 PM instead.)

Given such a dusk abort, the next regularly scheduled dawn transition is unaffected. As an alternative, the program can be selected to operate so that the next dawn transition is automatically rescheduled for a fixed interval after the dusk abort, thus conserving the time in darkness allotted for a standard sleep duration. For example, a user who normally sleeps from 11 PM–7 AM, but who cancels the dusk fade and goes to sleep at 9 PM, will receive the next dawn transition at 5 AM.

The user can cancel a dusk fade that is already in progress (triggering a rapid fade to darkness, e.g., 2 min), in order to quickly initiate sleep within a darkened room. (Scheduling of next dawn transition following such abort is unaffected.)

The user can cancel the next scheduled dawn fade, in order to awaken at a different time without a displaced dawn signal. (For example, a user who normally awakens to a dawn at 6 AM decides to awaken at 7 AM to normal room light without an accompanying simulated dawn signal.)

The user also can cancel regularly scheduled dawn which is already in progress, in order to extend sleep in a darkened bedroom, or to awaken for the day without the remainder of the simulated dawn signal. As an alternative, the user can terminate the progression of a dawn in progress and trigger a rapid rise (e.g., 2 min) to maximum system output illumination, in order to quickly arise within a lightened environment. (Scheduling of the next dusk transition following either type of dawn abort is unaffected.)

D. REGIMEN MENU. Here the user selects continuous illumination, dawn+dusk signals (light off during specified daylight hours), dawn signal only, dusk signal only, level of cloud cover (partly to fully cloudy). The user can choose to receive (a) a continuous 24-hour naturalistic modulation in light output, comprising the nighttime interval, the twilight transitions, and the daytime interval (to the maximum illuminance available from the light source), or (b) selected intervals within the continuous signal, including the dawn transition, dusk transition, or both transitions. The user can also select a pattern or level of simulated cloud cover during continuous daylight illumination, in order to meet individually preferred levels of ambient illumination during the waking interval.

The program also includes a selectable module such that dynamic variations of daylight illumination are simulated according to passing cloud cover. This is accomplished by providing the program with a mathematical model affording continuous random variations in output intensity. An empirical model based on empirical measurements of passing cloud cover also could be used.

The unit can be activated via a software command wherein a user can cancel all signals scheduled for a particular day (light extinguished), for example, when away from home. Also available is a command to permit the user to cancel in advance light signals for sets of days within the week (e.g., weekends).

The program also permits the user to cancel in advance light signals for specified days on the calendar (e.g., holidays).

The Regimen Menu has the following sub-menus.

D.i. SKIP DAYS MENU. The user is to specify standard days of the week and/or specific calendar dates on which dawn signal, dusk signal, or entire cycle should be omitted (light extinguished), for example, on holidays.

D.ii. PHOTOPERIOD ACCELERATION MENU. As part of the Regimen Menu the user can select to skip a given number of days within a continuous calendar progression, in order to accelerate the change in photoperiod across days and seasons of the year. For example, skipping every other day would provide a complete annual photoperiod cycle within 6 months.

D.iii. AUDIO ALERT MENU. The user is to specify if and when audio chimes should be sounded relative to sunset and/or sunrise. This feature provides ancillary signals for bedtime (relative to dusk) and rise time (relative to dawn), and uses the computer's audio output channel.

Additionally, the user can have an audio signal presented at a specified interval relative to the dawn transition (e.g., 10 min later, for audio signalling at 7.10 AM following a 7.00 AM simulated sunrise, set for the time of desired awakening). The use of standard snooze functions with the audio alarm does not affect progression of the dawn signal.

The user also can preset an audio signal at a specified interval relative to the dusk transition, in order to signal the impending onset of simulated dusk, as a reminder of approaching desired bedtime (e.g., 10 min earlier, at 10.50 PM, to signal a dusk fade scheduled to begin at 11.00 PM).

E. EXPOSURE MENU. if the illumination regimen is to be discontinuous, the user is to specify the moment to extinguish light (relative to time of sunrise), and the moment to resume light (relative to sunset). The user is also to specify the level of proportional attenuation of entire cycle or, separately, dawn segment and dusk segment. The user can also specify the illuminance (lux) below which the lamp should never fall (for example, 5 lux, in order to maintain visibility in an intensive care unit or animal care facility).

The program permits the user to specify the moment to extinguish light presentation during the daytime interval, as a function of the interval elapsing since the simulated sunrise, and to resume light presentation at a specified moment prior to the onset of the simulated sunset. Also, the user can specify an attenuation factor (between 0 and 99% of the momentary maximum illuminance determined by the naturalistic light simulation algorithm), while maintaining a constant curve shape of illumination output of the light source, over the entire 24-hour light cycle or, separately, for the dawn and/or the dusk segments. For example, the dusk segment may be attenuated by 50% of maximum in order to preserve the dusk wave form while eliminating high-amplitude stimulation that might be activating during the interval immediately preceding desired sleep onset.

Further, the user can specify the maximum illuminance (in lux) at the desired target surface, beyond which increases in light level specified by the naturalistic simulation algorithm are capped. For example, daytime illuminance might be capped at 1500 lux in order to avoid possible adverse reactions to protracted exposure to higher intensities, such as irritability and agitation, and/or undesired circadian phase shifts; or for open spaces, as in the work place, where higher levels of illumination are not permissible (e.g., given reflective work surfaces).

Also, with the program, the user can specify a minimum illuminance level (in lux) at the desired target surface, below which the light level will never decrease even when the naturalistic illumination algorithm specifies darker conditions. For example, the minimum might be set at 5 lux within an intensive care unit, providing an adequate but minimal level of visibility to nursing staff. Alternatively, the minimum might be set at 50 lux in a shift work environment, assuring that normal task visibility is adequate at all times, and light levels do not fall as low as to induce drowsiness on the job or sleep onset.

The Exposure Menu has several sub-menus.

E.i. VARIABLE DAYLIGHT MENU. this enables a random-walk algorithm that operates between sunrise and sunset imposing dynamically changing illuminance levels, in simulation of passing cloud cover. The user is to specify rate of change of illuminance level (for example, on 1–10 scale) and magnitude of attenuation from momentary maximum value [i.e., cloud cover factor (see Section I.D)]. If maximum lamp output (for example, 3,000 lux) does not provide outdoor daylight levels (for example, 50,000 lux), the program attenuates output relative to maximum illuminance available. This option is designed for use in office, industrial, and institutional environments where constant illumination levels are considered to be a stress-inducing factor. User can toggle this option on and off while on-line, or readjust random-walk parameters.

As part of the cloud cover module of operation the user can adjust a cloud cover amplitude factor (e.g., on a 1–10 scale) in order to set the range of depth of momentary attenuation in simulation of passing cloud patterns. For example, if passage through deep cloud cover, with troughs in the twilight range of illuminance, prevents adequate task vigilance, the user may specify a narrower range of attenuation which still maintains the perception of momentary daylight variation.

Further, the user can switch between standard, continuous algorithmic output and variable cloud cover attenuation. For example, during periods of critical visual task vigilance (as when engaged in repetitive signaling monitoring), the variable cloud cover could be suspended for a limited specified time interval during the day. Alternatively, intervals of cloud cover simulation could be scheduled to enhance alertness during certain monotonous work tasks.

F. TIME LINK MENU. choose between (1) Natural Time; (2) Delay or Advance Shift, in order to phase-shift the illumination cycle relative to external clock time (for example, an 8-hr phase delay for a night-shift worker); or (3) arbitrary anchoring of sunrise and/or sunset to specific time(s) of day.

The Time Link menu can set a dusk onset for a specified interval prior to expected onset of sleep. To do this, the user sets the moment of simulated sunset, and the dusk that follows, with respect to the desired time of sleep onset. For example, if the user desires to fall asleep at 11.00 PM, the time of sunset might be set 20 min earlier, at 10.40 PM. The user learns by experience when using the system when he typically falls asleep relative to dusk.

The Time Link menu has several sub-menus.

F.i. SMOOTH CLOCK-TIME TRANSITIONS MENU. The user can specify dates of transition (or select from list of major locations) between Standard Time (ST) and Daylight Saving (or Summer) Time (DST). The user is also to specify whether change in light cycle should be abrupt or smoothed. If abrupt, daily cycle is suddenly shifted forward or backward by one hour beginning Sunday morning of new clock time. If smoothed. (a) for ST-to-DST, the cycle is shifted later by 10 min per day for 6 days, following the clock change; (b) for DST-to-ST, the cycle is shifted earlier by 10 min per day for 6 days, prior to the clock change. In both cases, the user awakens gradually earlier than normally during the 6-day transition period. This feature is designed to ameliorate transitory mood shifts and sleep disturbances experienced by some people when sudden clock time changes occur (esp. DST-to-ST).

The output of the computer which runs the program can operate a clock, or any appliance whose function is governed by a clock in real time. This would automatically shift the clock's current readout instantaneously to advance forward by one hour at the start of DST, and to reset one hour earlier at the start of ST. This is governed by a calendar or day-counter on which the transition dates for each time shift are flagged.

Calendars as part of the program can be flagged with default dates as well as reset by the user if local dates differ. The successive times of simulated sunrise and sunset are automatically adjusted in a daily progression over a sequence of several days, in specified step sizes (e.g., 1–60 min per day) before or after the date of the time shift, in order to ease the sleep interval (and underlying circadian phase) into a constant phase relation with external clock time before and after the time shift. For example, for a shift from ST to DST, the entire light cycle is shifted later by 10 min per day over 6 days following the clock change, and sleep phase is gradually adjusted later by one hour relative to standard time. For the opposite time shift, the light cycle is shifted earlier by 10 min per day for 6 days, for example, preceding the change from DST to ST.

F. ii. GEOGRAPHIC RELOCATION MENU. This feature arranges a transition in the illumination cycle, simulating a shift across longitude and/or latitude, in gradual or sudden steps. This feature is used, for example, as a preparatory jet-lag countermeasure, allowing accommodation to destination conditions (lighting and sleep-wake cycle) before travel. As another example, this feature can support "chronotherapy" of Delayed or Advanced Sleep Phase Syndrome at a constant location [for example, a New Yorker with a 5-hr chronic sleep phase delay (4 AM sleep onset) is considered to be functioning under Alaskan time; under a 5-hr easterly "geographic relocation" sleep onset is normalized at 11 PM].

In operating the program, the user specifies, via the keyboard, parameters (for example, latitude, longitude) for both locations, date of "arrival" number of days for transition (for example, 1–10), and direction of shift (by phase delays or advances). For gradual transitions (>1 day), the program determines a sequence of equal daily steps in geographic displacement (latitude, longitude) between origin and destination, and adjusts the lighting cycle accordingly. As an option, a standard illuminatian wave form [for example, from Sleep Duration Menu (Section 1.c.i.)] can be maintained throughout, manipulating the time link only. Upon completion of parameter selection, a text file lists successive dates for the transition, times of changing sunrise (expected wake-up time) and sunset, and daylight intervals at the origin location during which bright outdoor light exposure should be avoided (for example, by use of filtered glasses) in support of the circadian rhythm phase shift.

Also, the geographic relocation menu provides for the selection of a progression of a simulated daily illumination cycle which is made to correspond to specified shifts in geographic latitude and/or longitude, in gradual or sudden steps. For example, for a geographic transition between New York and Rome, with an 8-hour phase advance at similar latitude, the originating light pattern in New York could be shifted earlier by one hour per day for 8 days, as a preparatory jet-leg countermeasure. As another example, for a geographic transition between New York and Bogota, Colombia, South America, which are at similar longitude and time zones, but differ in latitude, the progression of dawn and dusk onsets, and associated changes in the twilight transition profiles, can be arranged in southerly steps of 5 deg latitude per day over seven days, resulting in photoperiod changes commensurate with the season of the travel. Such latitudinal shifts may also serve a therapeutic benefit, as, for example, in relocating a depressed patient in winter, by means of light simulation, to a latitude in the same time zone with an expanded photoperiod, even without actual geographic relocation or travel. As another therapeutic example, a person with delayed sleep phase syndrome who awakens at 11 AM in local time, could be shifted in gradual longitudinal steps by the simulated daily light pattern, to a time zone four hours earlier, supporting a corrected time of arising at 7 AM.

The above means of latitudinal and longitudinal shifts in daily light exposure may by necessity be accomplished in conjunction with use of filtered eyeglasses or dark goggles when outdoor light exposure would interfere with desired, displaced simulated lighting intervals. For example, a night shift worker who adjust his sleep interval and circadian phase for a 12-hour inversion relative to local time would protect himself from outdoor or indoor bright light exposure during the displaced twilight and nighttime intervals, e.g., around noon.

Figure 5A:
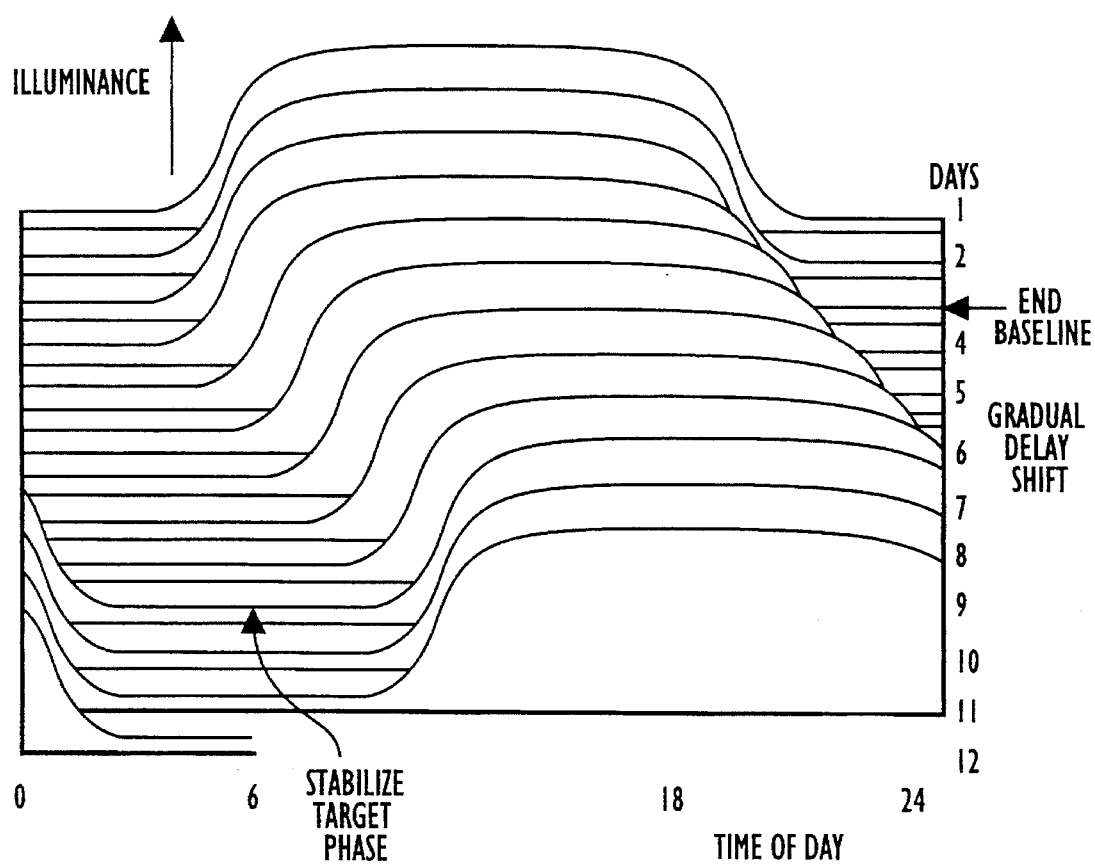
FIGS. 5A–5C are diagrams showing phase shifts (delays and advances) in the production of the illumination across successive days.
Figure 5B:
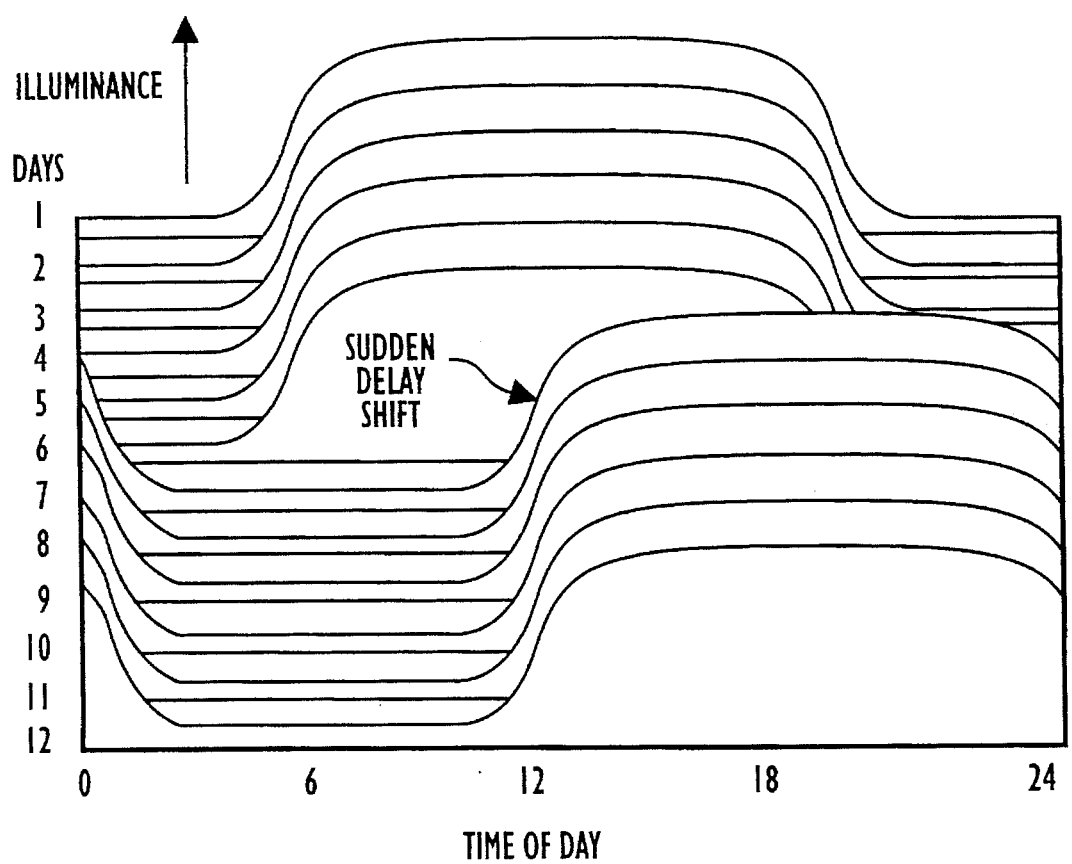
Figure 5C:
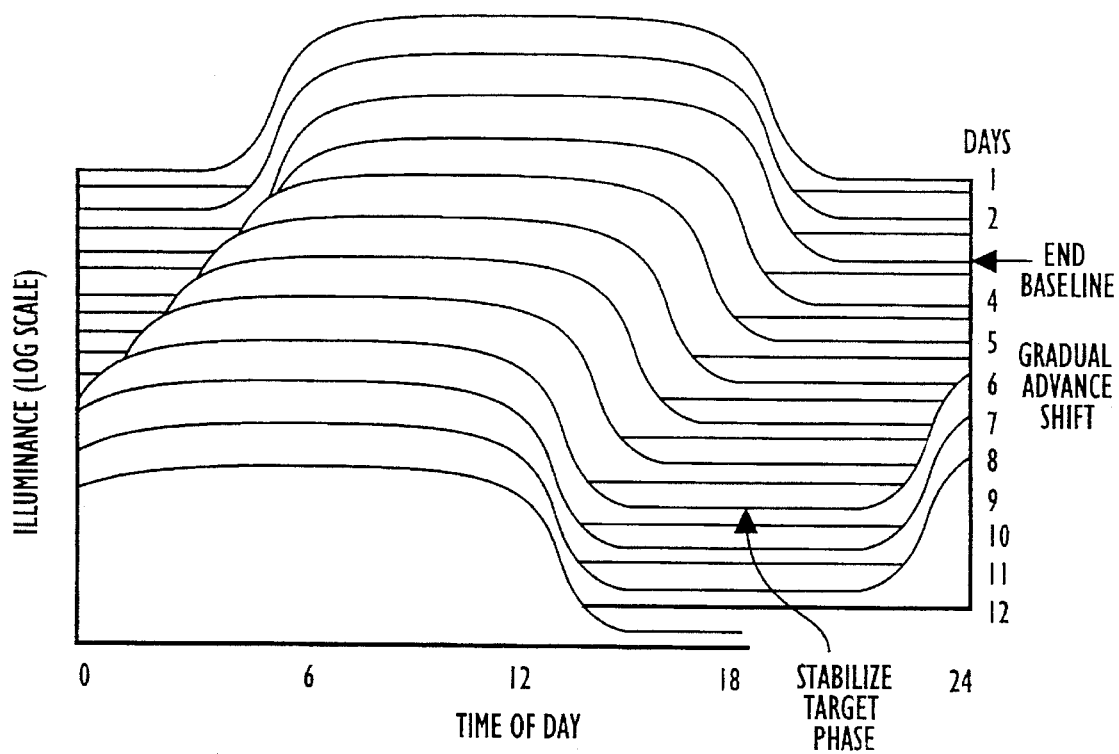

FIGS. 5A and 5B show gradual and sudden delay shifts, respectively, of the illumination protocol across days, and FIG. 5C shows a gradual advance-shift protocol. The time of day versus the illumination level on different days are shown. As can be seen in FIG. 8A, there is illumination for about 14–16 hr per day, this duration being controllable, and the time at which the illumination begins and ends is shifted across days in small steps. This is illustratively shown as a progression of illumination toward the latter part of the day beginning on Day 4 of the sample and ending on Day 9, after which the illumination pattern is stabilized at a new, standard phase across days, 6 hrs later than the baseline Days 1–3. In FIG. 5B, for a number of days, shown as 1–6, the illumination period is kept constant. Then there is a sudden shift to a cycle 6 hrs later on Days 7–12. It should be understood that any combination of the cycles as shown in FIGS. 5A–5B can be accommodated. FIG. 5C illustrates a gradual advance shift across Days 4–9, for a phase adjustment to an earlier daily time period of illumination, opposite in direction from that shown in FIG. 5A. In the periods of illumination which are shown in FIGS. 5A–5C, the specific local pattern of changing light level can be varied over each successive day, for example, to correspond to a gradual dawn to dusk transition for a selected geographic location.

F.iii. CONTINUOUS MOTION MENU. The selections available here are designed to simulate the dynamically changing level of momentary light availability at a continuously moving locus on the earth. (1) Shortest path option specify latitude and longitude of origin and destination. For strict latitude or longitude shifts, the user is to specify start time at origin and end time at destination (for example, hours traveled); for joint latitude and longitude shifts, specify rate of movement between origin and destination (degrees per hr). The program assumes a constant rate of motion. Time values are all referenced to the origin. If 180 deg latitude or longitude shift, the user is to specify direction (for example, westerly, southerly). (2) Cartographic trajectory option the program draws a line or curve over a screen display of world map connecting origin and destination (for example, polar projection for an airline route), start time at origin and end time at destination (for example, hours traveled), or rate of movement between origin and destination (degrees per hr). It has the capability to print a text file of illuminance level as a function of time and location relative to the origin.

This option is useful for jet-flight simulations and associated psychophysiological research on acute response to the aberrant lighting signal. Although the program's basic algorithm predicts light available on the earth's surface, flight simulations allow specification of average altitude, correcting for changes in position of horizon and atmospheric factors that affect momentary light availability.

The Continuous Motion Menu also has a function in which the momentary level of light presented by the system is determined according to the algorithm by a continuously changing path of latitude and/or longitude changes during a simulation of travel between remote geographic locations, while the user in fact remains at one geographic location. This feature employs as anchor points the location of travel origin and destination, the trajectory of travel, and the duration and rate of travel, including intermediate stopovers. For example, in indoor simulated military maneuvers and flight simulations, whether in group operations centers or the individual cockpit environment, the lighting level would change dynamically according to the on-line pattern of geographic dislocation as a continuous function of time of day.

F.iv. FIXED SHAPE SKELETON PHOTOPERIOD MENU. This feature enables variable time anchoring of a selected dawn/dusk wave form. This provides a strict analog to rectangular-pulse skeleton photoperiods—as used in circadian rhythm research—in which the light is briefly turned on to full intensity (for example, 30 min at 500 lux) at putative "dusk" and "dawn" phases, and both "nighttime" and "daytime" intervals are darkened. In such experiments, the interval between "dawn" and "dusk" pulses is manipulated without changing their (rectangular) wave form. Using the naturalistic algorithm, however, the "dawn pulse" is a gradually increasing ramp and the "dusk pulse" is a gradually decreasing ramp, parameters of which depend on geographic location and day of year. Without use of the Fixed Shape option, two contrasting skeleton photoperiods can be constructed, for example, for a given latitude in summer (long photoperiod) vs. winter (short photoperiod); however, the dawn and dusk wave forms would also vary seasonally. Using the Fixed Shape option, a constant dawn/dusk wave form is specified (for example, equator at equinox), and the interval between sunrise and sunset is manipulated (for example, 14 hr or 9 hr).

Constraints in use of the Fixed Shape option are. (1) it utilizes Repeat Date, not Calendar Progression [Light Pattern Menu (Section 1.C)]; (2) the dusk signal must reach starlight minimum level before onset of the dawn signal, i.e., no overlap in the signals is allowable; and (3) the dawn signal can be extended beyond sunrise, and dusk signal can be commenced before sunset, only for intervals less than or equal to half the duration between sunset and sunrise, i.e., no overlap in the signals is allowable.

The Fixed Shape Skeleton Photoperiod Menu has a selection for a program module whereby the dawn and dusk twilight transition profiles, for a given desired geographic location and date, can be maintained while artificially triggering either or both transitions at times of day which differ from the naturally occurring moments of sunrise and sunset. For example, the equatorial dawn and dusk illumination intensity wave shape, in which sunrise and sunset occur close to 6 AM and 6 PM, respectively, can be maintained while expanding the photoperiod duration to 14 hr, with sunrise at 8 AM and sunset at 4 PM. This feature may be required for controlled research studies of photoperiodic phenomena, in order to accomplish daylength manipulations without changing the wave shape of the twilight transitions, as would normally occur.

As a selection of the Continuous Motion Menu (Section F.iii) there is the option of arbitrary dawn/dusk anchoring. This maintains the shape of the light illumination transition curve over the time in question and can vary the photoperiod. Thus, the menu permits selection of the moment of simulated sunrise or sunset on any naturalistic transition curve can be set for any time of day in order to synchronize the circadian clock to a daily schedule that may deviate from the prevailing outdoor illumination cycle. For example, a night shift worker may select a sunrise time at 5 PM in order to present a naturalistic dawn signal towards the end of the displaced sleep interval, in anticipation of a 7 PM—midnight shift schedule. As a second example, an individual with delayed sleep phase syndrome may be directed initially to set the time of sunrise for the baseline time of spontaneous awakening (e.g., noontime), and then to adjust this dawntime anchor earlier in discrete steps over successive nights in order to promote circadian phase advances that serve to normalize the timing of the sleep interval, after which the cycle is stabilized.

Similarly, an individual with advanced sleep phase syndrome may be directed initially to set the time of sunset for the baseline time of spontaneous sleep onset (e.g., 8 PM), and then to adjust this dusk-time anchor later in discrete steps over successive nights in order to promote circadian phase delays that serve to normalize the timing of the sleep interval, after which the cycle is stabilized. In a related example, the individual's sleep time is monitored directly by activity sensors mounted on the mattress, or by a wrist-activity monitor, and on the basis of such objectively-recorded feedback the supervising clinician determines the progression of successive nightly shifts in dawn and/or dusk time in order to promote optimum phase adjustment toward the targeted schedule. In an elaboration of such a daily feedback protocol, the individual logs each day's time of sleep onset or arising (or transfers corresponding data logged automatically by a mattress-or wrist activity monitor) onto a computer, wherein a program determines the optimum nightly interval by which the dawn and/or dusk signal is phase advanced or delayed. For example, given the long-term objective of a 3-hour phase advance in circadian rhythms, the computer program determines a nightly 30-min phase advance of the illumination cycle relative to the midpoint or end of the preceding night's sleep episode. Thus, the rate of the progression toward earlier illumination cycles across nights is adjusted to the rate at which the individual's behavioral pattern advances in its phase.

There is also provided as part of the menu the selection of any naturalistic dawn and dusk illumination level transition curve (specified in terms of latitude and day of year), but the time anchoring of sunset and sunrise is varied arbitrarily, such that the transition wave forms of dawn and dusk are maintained while the daylight interval (photoperiod) is manipulated. The only constraint on such arbitrary photoperiod manipulation is that the intervals of the dawn and dusk illumination transitions cannot overlap. For example, a summer solstice twilight transition is selected at 45 degrees N lat, but the daylight interval is contracted such that night length and daylength are equalized, i.e., an equinox photoperiod is presented with relatively extended summertime twilight transitions. The utility of such manipulation is in holding transition wave shape constant while varying the photoperiodic signal, as may be necessary for experimental studies of physiological response to photoperiodic variation. Furthermore, this method allows tailoring of relative night- and daylength while maintaining an optimum naturalistic transition curve, as may be required in specific therapeutic applications. For example, relatively rapid dusk and dawn equinox transitions could be presented within a short summer nighttime interval, for presentation during midwinter in treatment of winter depression.

The program can also accept any arbitrary user-defined illumination ramp for presentation of dawn and dusk transitions (for example, a log-linear or log-sigmoid progression of light intensity, or a manually-specified progression entered graphically or as a text file listing) that differ from the progressions specified by the program's algorithm for naturalistic illumination transitions. Such arbitrary wave forms can then be used by the program to present daily illumination cycles in the same manner as the program uses to shift illumination phase across days, to anchor dawn and dusk transitions to specific times of days, to vary the length of the daily photoperiod, to vary the cyclic time base for non-24-hr cycles, etc.

The program also can be used to determine a naturalistic approximation to any specified illumination transition curve. Under this procedure, the program accepts as a user-input a mathematically defined illumination ramping function—entered graphically, algebraically or via text file—and the software searches for the closest approximation (statistical best fit) to a naturally occurring transition as a function of latitude and day of year.

The program permits the time base of available naturalistic transition curves to be expanded or contracted to optimize a fit to the user-defined transition function, while maintaining the underlying naturalistic wave form. Also a range of naturalistically fitted functions, so described, is returned in the order of statistical goodness-of-fit to the user-defined ramping function, thereby permitting the user to select a preferred approximation for administration by means of a continuously varied lighting device. For example, under an enhanced work place lighting regimen, a gradually increasing transition function is selected for presentation over the initial segment of a work shift (e.g., 40 min) in order to ease the course of adaptation to ambient bright light while minimizing the disruption of immediate bright-light presentation (for example, transient adaptation problems including glare, veiling reflections, and pupillary construction and dilation).

G. PERIOD MENU. This feature allows specification of a desired non-24-hr cycle length (T) in which to present a nominal 24-hour cycle (minimum 0.05 hr). Screen message is displayed noting that specified Clock Times are correct for the first cycle only, and thereafter are advanced or delayed in order to accommodate for changed period length.

Period manipulation can be used as an alternative to the phase-shifting strategy (Section 1.F.i) for implementing clocktime transitions (for example, T=23.9 hr for 6 days provides a net 1 hr phase advance, after which T=24.0 hr is resumed).

G.i. PERIOD EXPANSION/CONTRACTION MENU. This feature allows the user to modify the normal 24-hr time base of the naturalistic illumination transition function, expanding or contracting it to present proportionate illumination cycles. The specified periodicity can be as short as 1 min; for expanded periodicities, experimental applications as long as T=72 hr might be meaningful. For example, an entire daily cycle can be presented in 23 or 25 hr, in order to match the frequency of an individual's free-running biological clock under conditions of temporal isolation. As a further example, the natural 24-hour time base can be contracted to 8 hr in order to present a compressed naturalistic cycle synchronized to a sequence of three 8-hour work shifts (or contracted to 12 hr in order to present such a naturalistic cycle synchronized to a sequence of two 12-hour work shifts) within a 24-hour period, providing simulated dawn transitions at the start of each shift in anticipation of the work interval, and dusk transitions at the end of each shift in anticipation of the rest interval. Application of this module for the work place is feasible only when using the Minimum Illuminance feature under the Exposure Menu (Section E).

G.ii. LIMITED DURATION PERIOD CHANGE MENU. This feature provides a means for accomplishing a phase shift of the circadian system by temporary implementation of a non-24-hour period in the illumination cycle, preferably between T=23 and 27 hr. This period is selected for presentation over several days in order to elicit successive phase shifts of the internal circadian clock (phase advances or phase delays), thereby re-synchronizing the internal clock to a displaced daily lighting cycle. Upon reaching the desired phase-shifted position, the standard 24-hour cycle is reinstated in order to stabilize circadian entrainment to the newly-established displaced daily lighting cycle. For example, the period is changed to 24.1 hr for six days immediately following the annual transition from Standard Time to Daylight Saving Time, in order to promote a net circadian phase delay of 1 hour, after which the normal 24.0-hour period is reinstated, stabilizing circadian entrainment under DST. Similarly, the period may be changed to 23.9 hr for six days immediately preceding the annual transition from DST to ST, in order to promote a net circadian phase advance of 1 hour, after which the normal 24.0-hour period is reinstated, stabilizing circadian entrainment under ST. As a second example, the time of sunrise under an initial 24-h lighting cycle is set to match the spontaneous rise time of an individual with delayed sleep phase syndrome who awakens habitually around noontime. The period is then contracted to 23.5 hr and such signal is presented over 14 successive days for a daily circadian phase-advance of 30 min and a net advance of 7 hr, after which the 24-hour period is reinstated with sunrise at 7 AM and a normalized time of spontaneous awakening.

H. PARAMETER SUMMARY DISPLAY: This feature displays values of all parameters selected, defaults, and parameters not yet entered. The program has the capability to name and store the data set; print text file hardcopy of current parameters; modify a parameter while program is running, to substitute at start of next cycle; checks for incompatibility of parameters respecified after the start of a run; returns error messages, and initializes only after corrections are entered.

I. HELP DISPLAY: The user can select a Help screen by clicking onto any supported element in the menus. This provides detailed explanation at each choice, noting incompatible options.

II. RUN MODE

Figure 6:
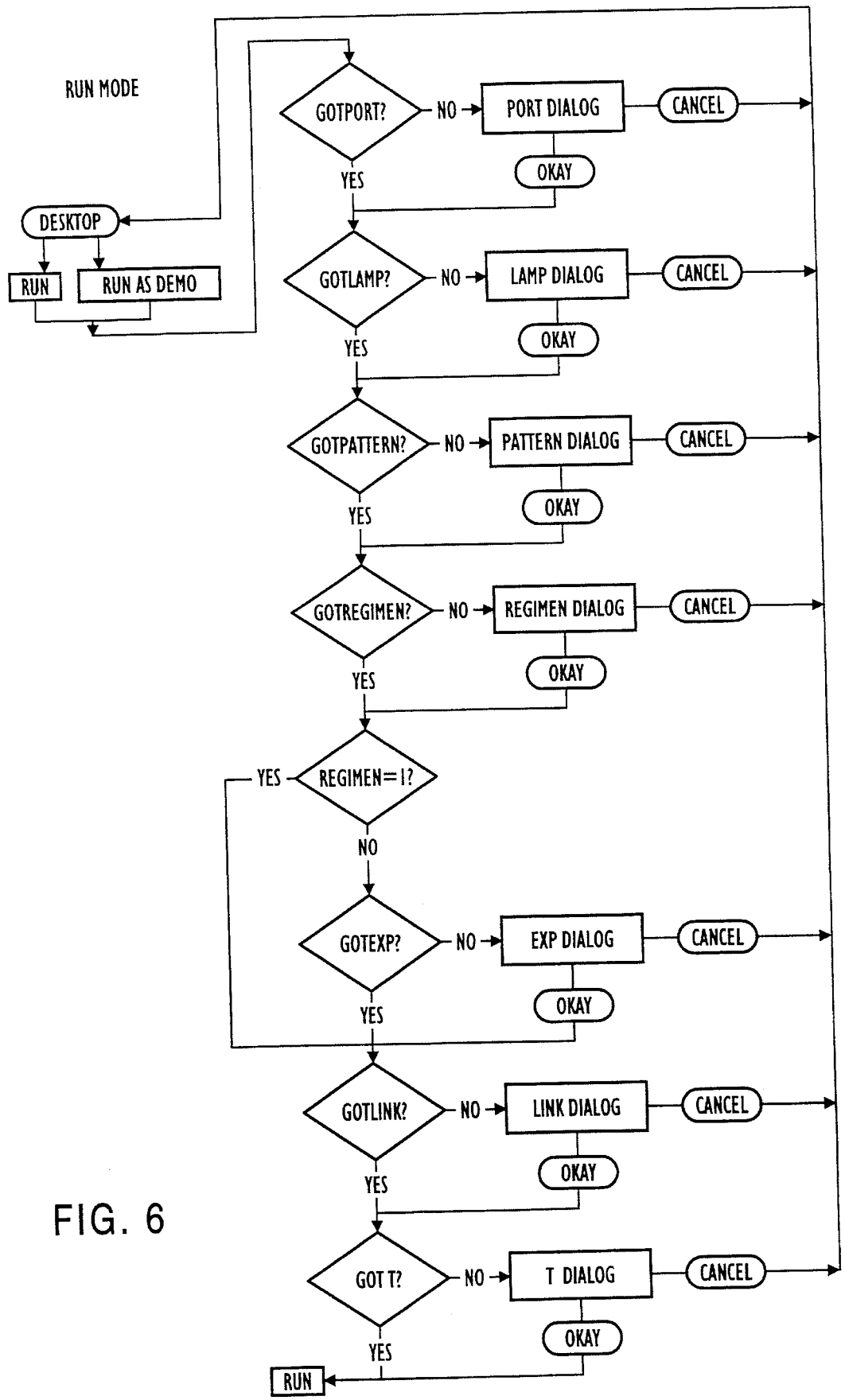
FIG. 6 is a flow chart for the RUN MODE.

FIG. 6 is a flow chart of the Run Mode. This mode checks for information entered in initialization dialog or from library parameter files; checks the port on which to send out signal; and which lamp type is being used. If information is incomplete, it first sets default values; if no defaults, it asks for data that are missing. If information is incompatible (for example, cannot extinguish light after sunrise if continuous light signal was selected), it displays error messages. If complete, sets and stores Current Values files, displays and initiates the run.

Figures 1, 7A:
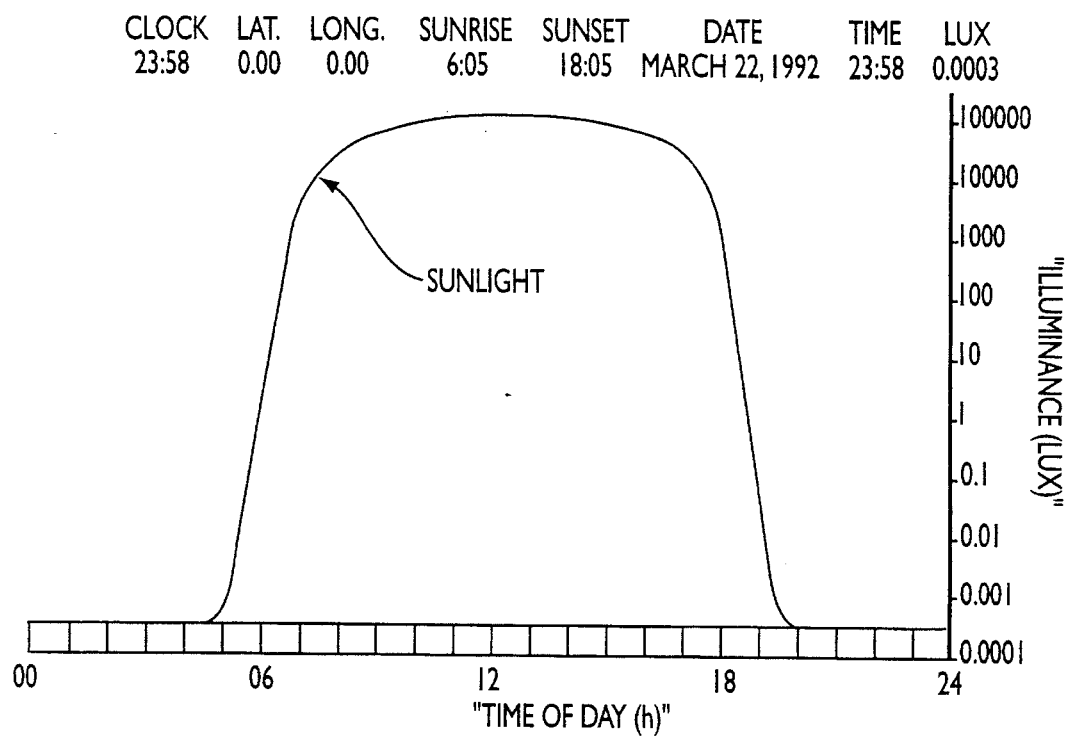
FIGS. 7A–7D show examples of the system's solar and lunar light simulation patterns under various calendar dates and latitudes.
Figures 2, 7A:
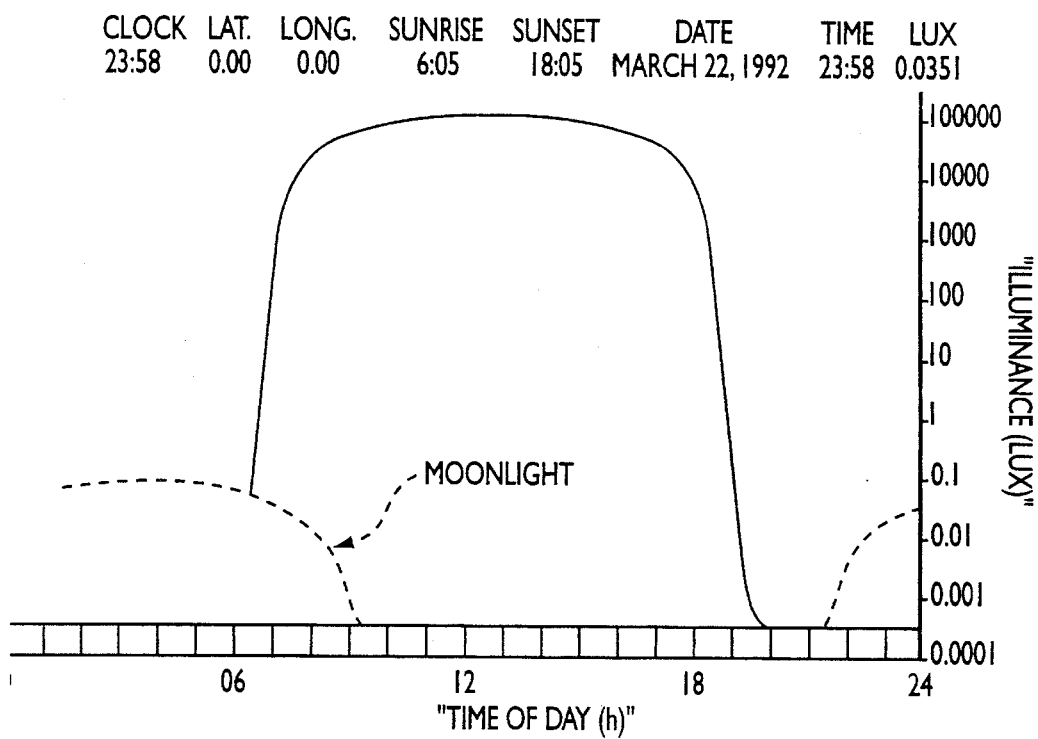
FIG. 2 shows the options for a QUICK SELECT of a lighting cycle and the profiles produced.
Figures 3, 7A:
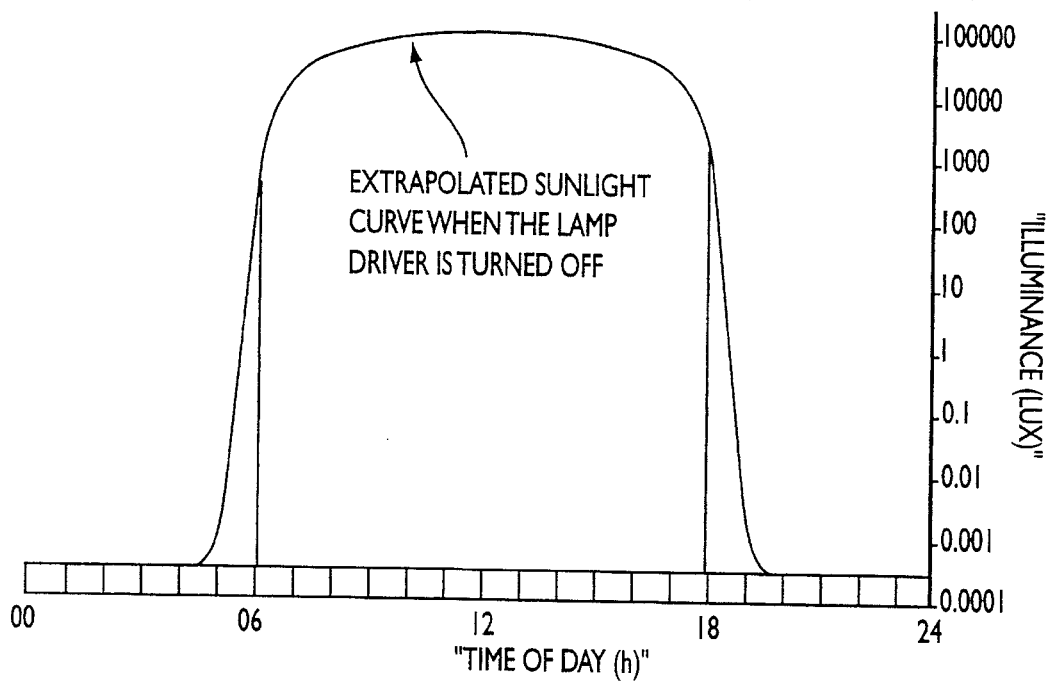
Figures 4, 7A:
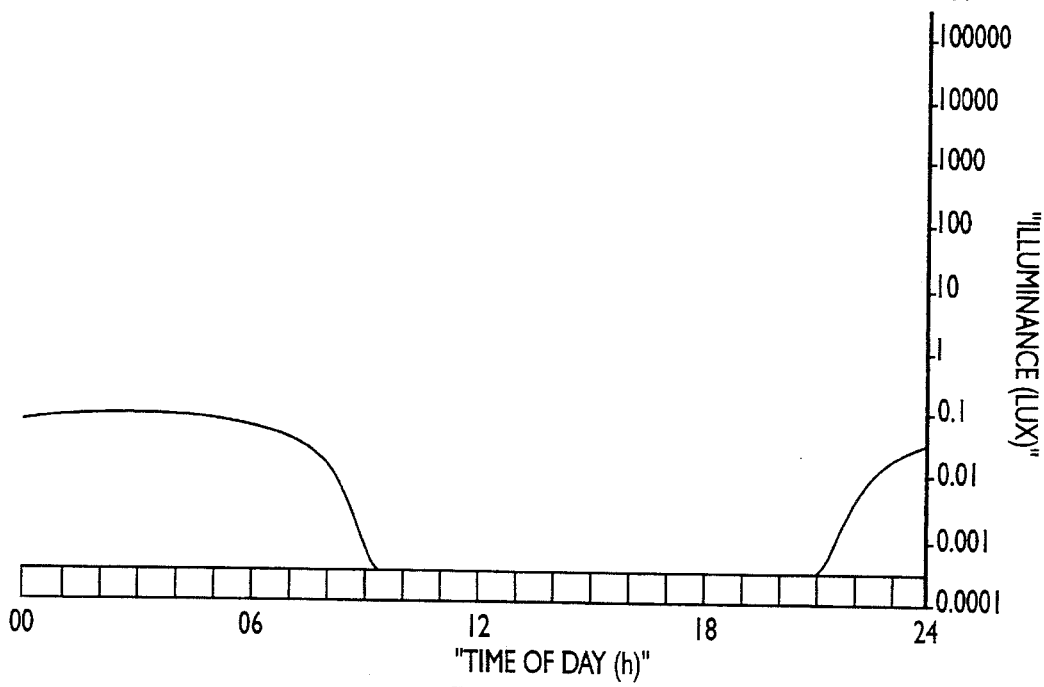
Figures 1, 7B:
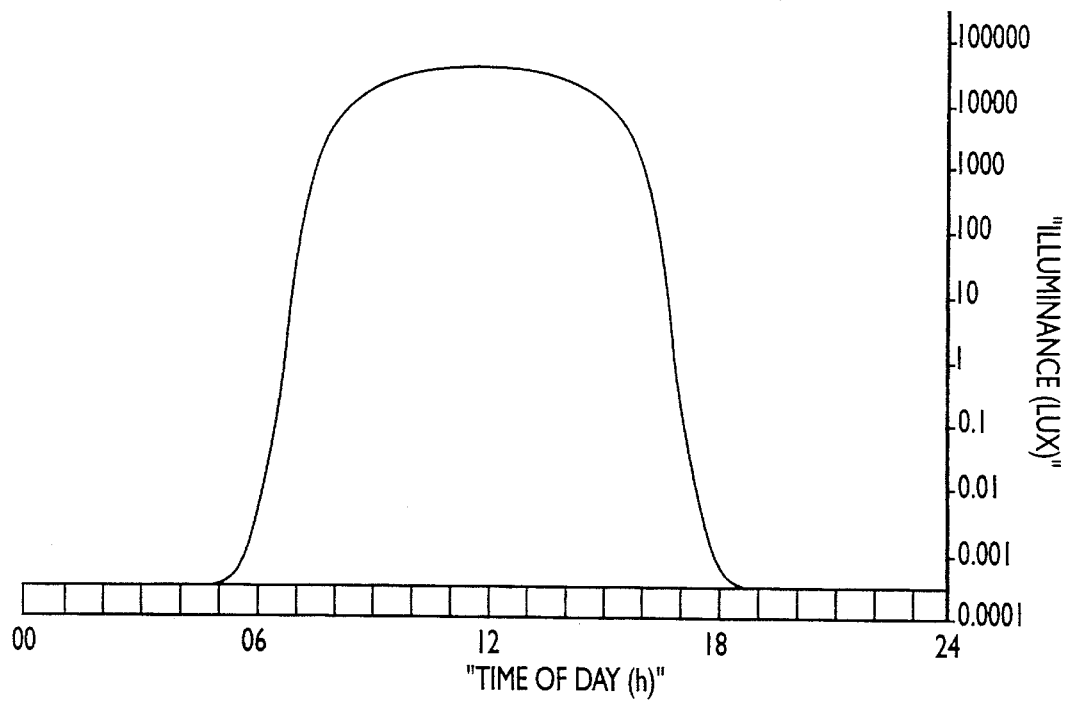
Figures 2, 7B:
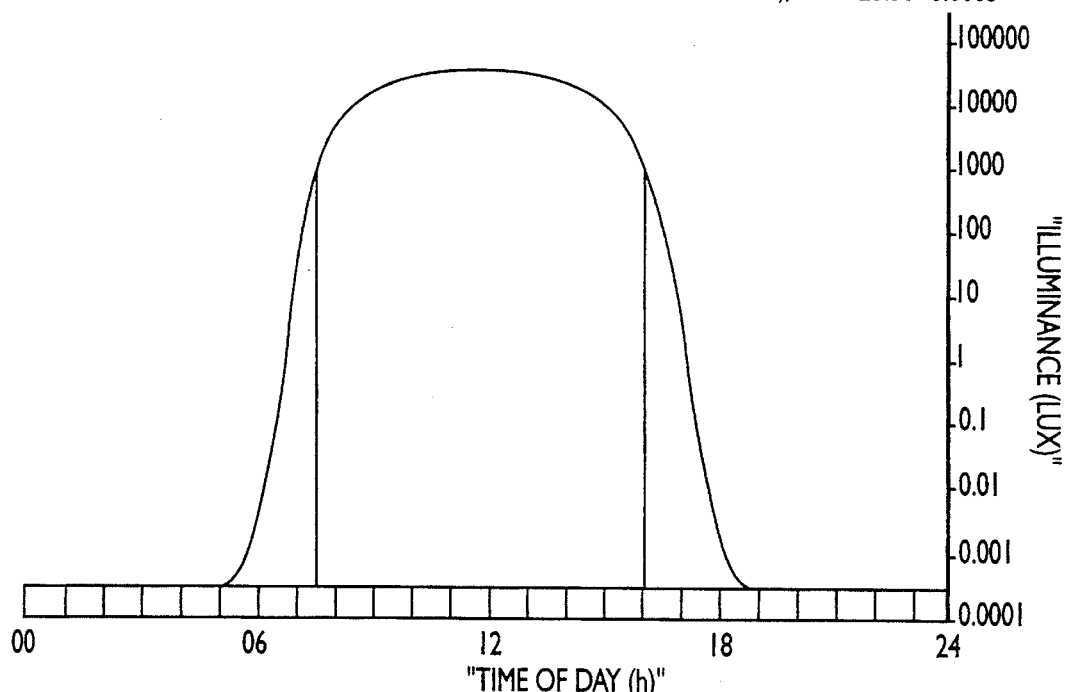
Figures 3, 7B:
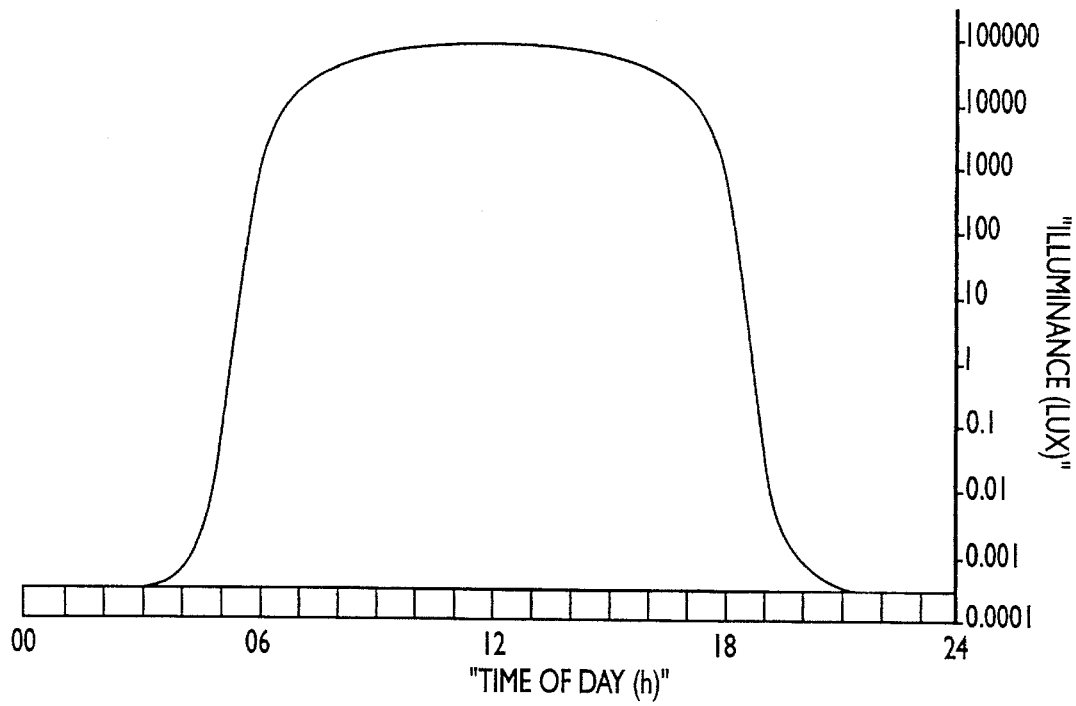
Figures 4, 7B:
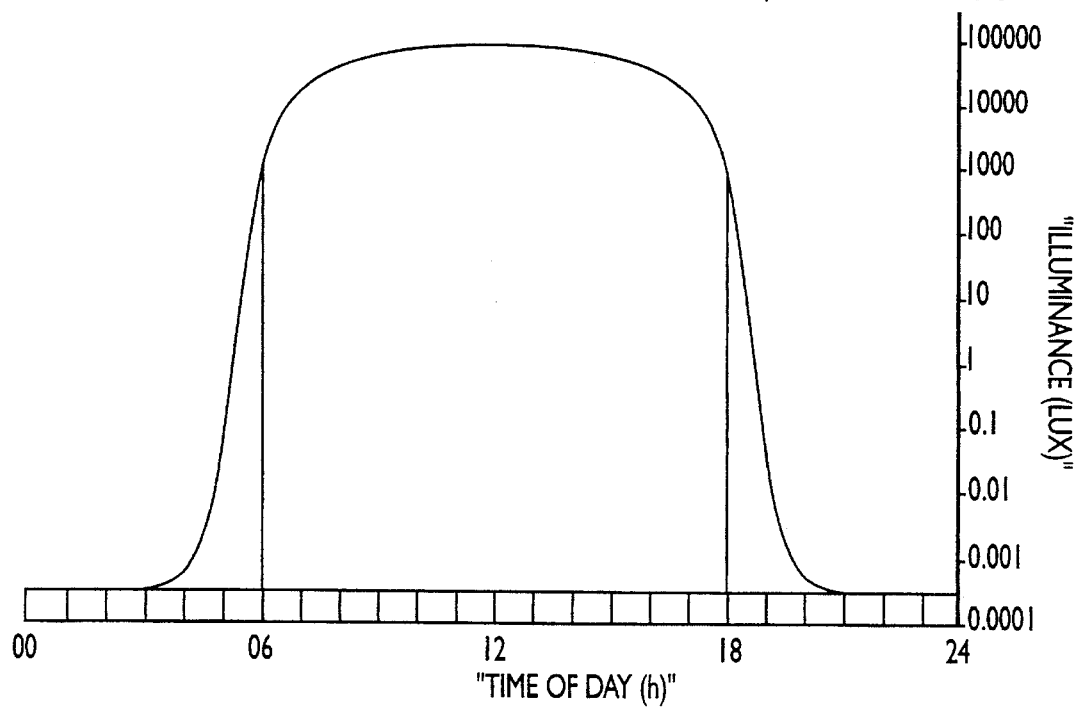
Figures 5, 7B:
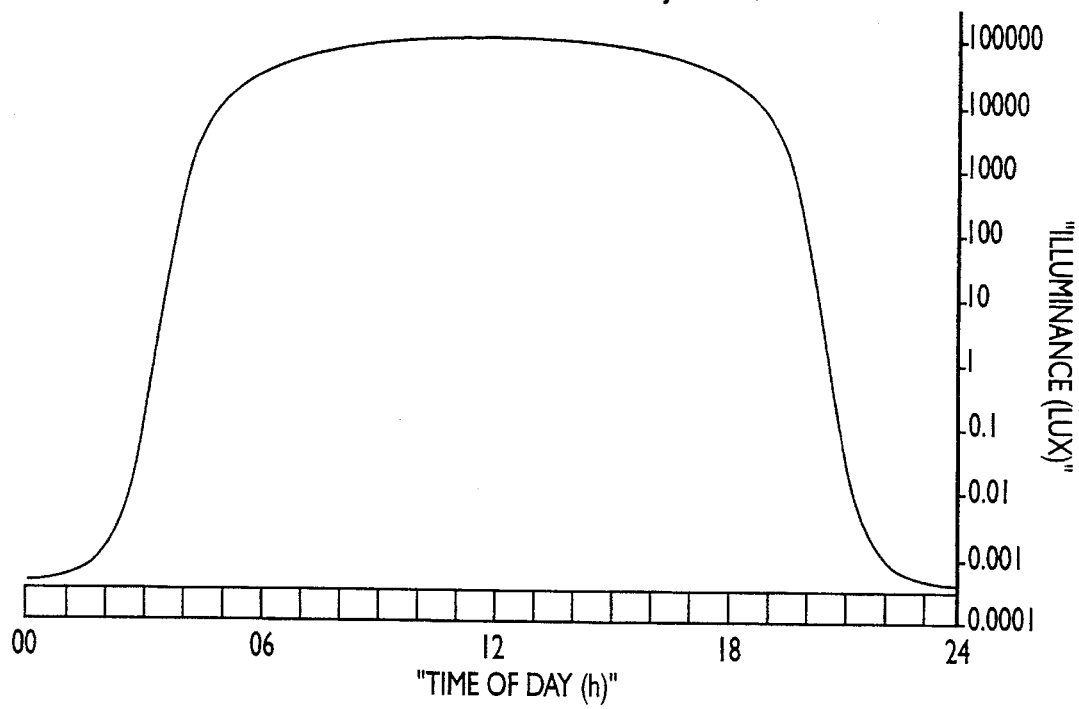
Figures 6, 7B:
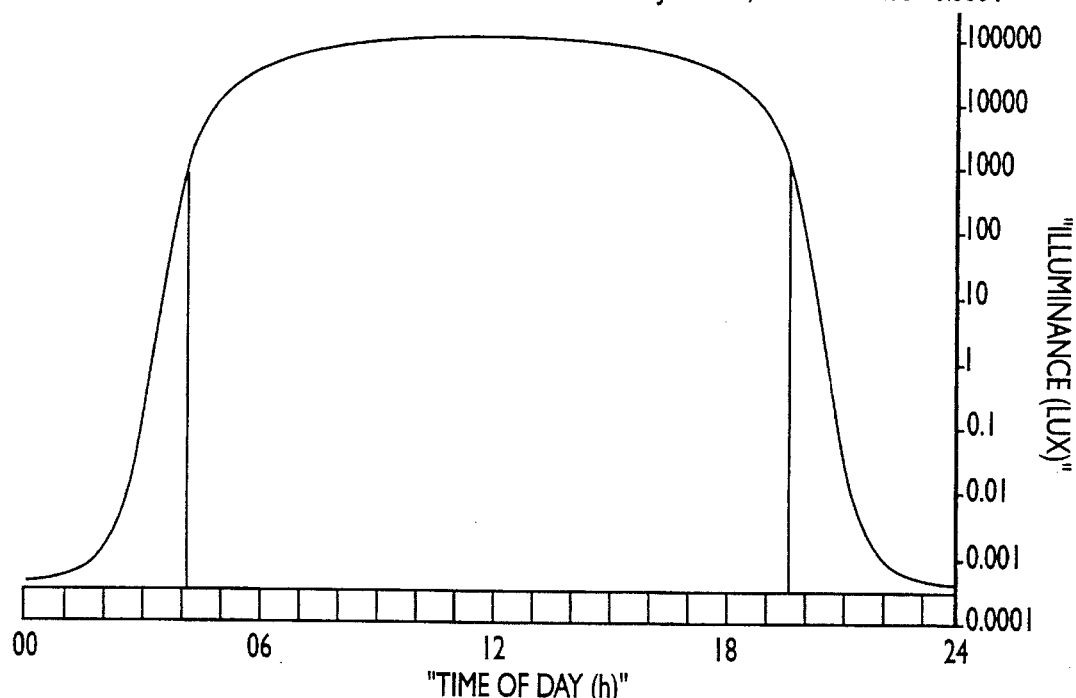
Figures 1, 7C:
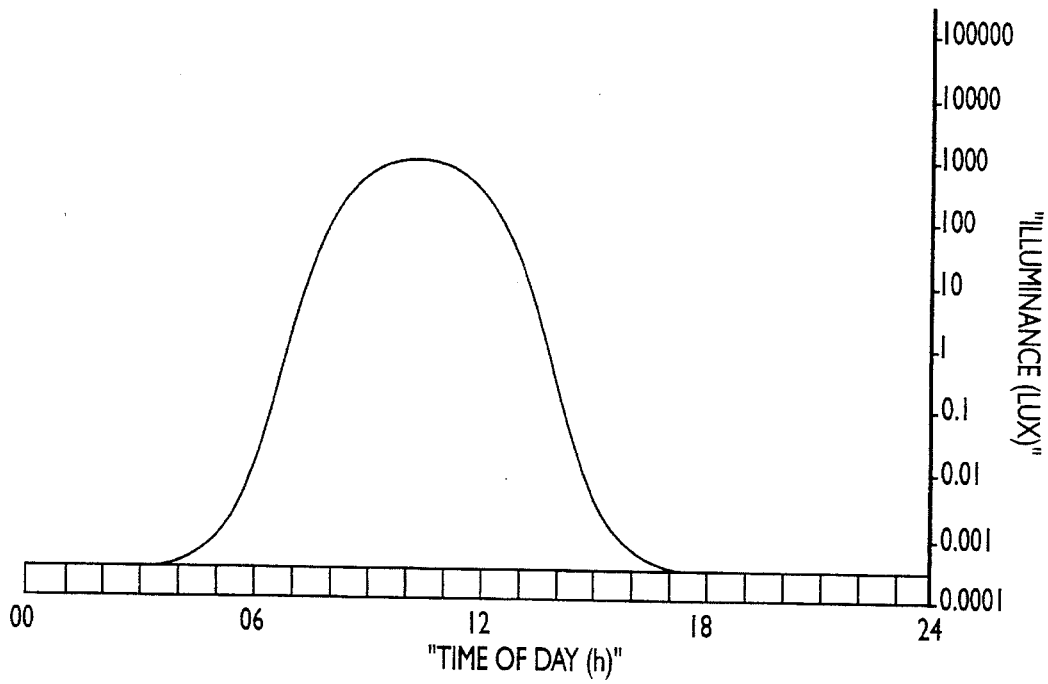
Figures 2, 7C:
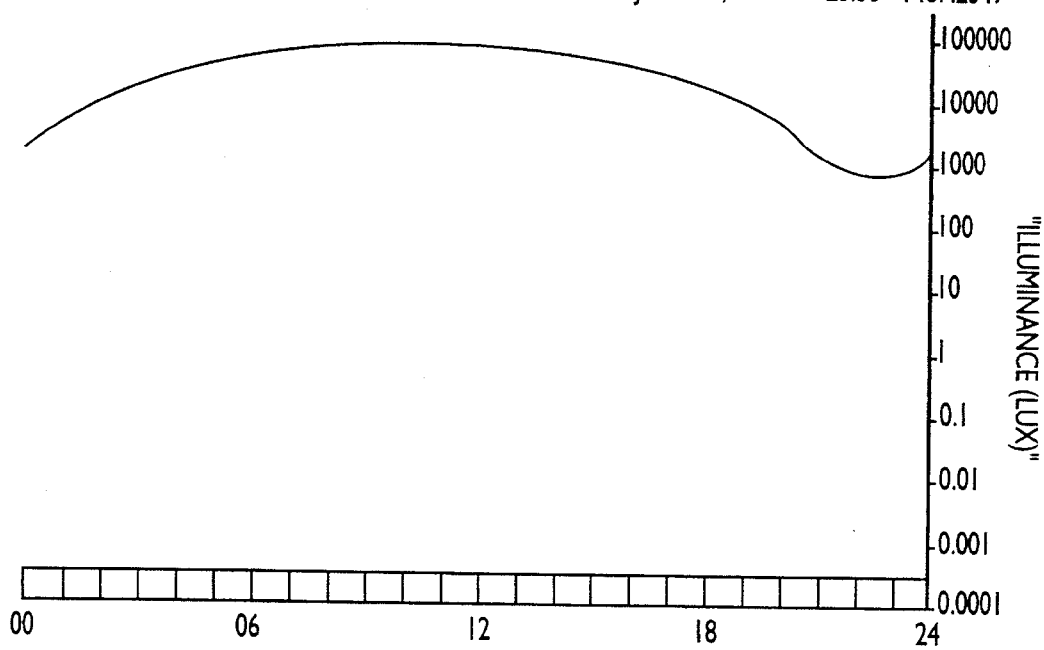
Figures 3, 7C:
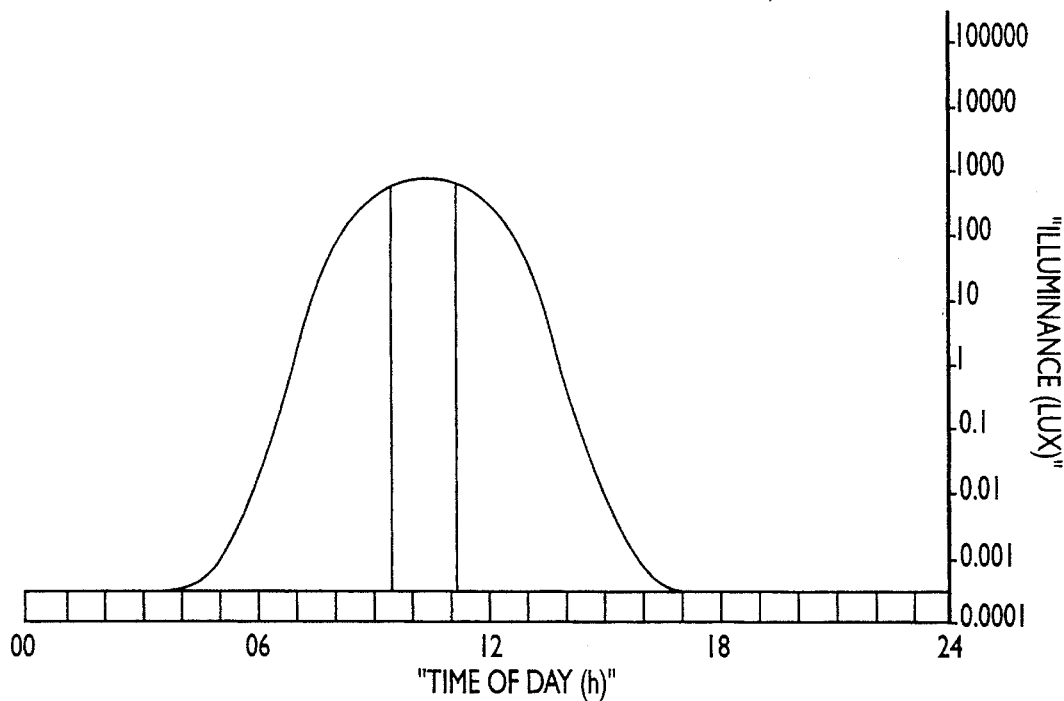
Figures 4, 7C:
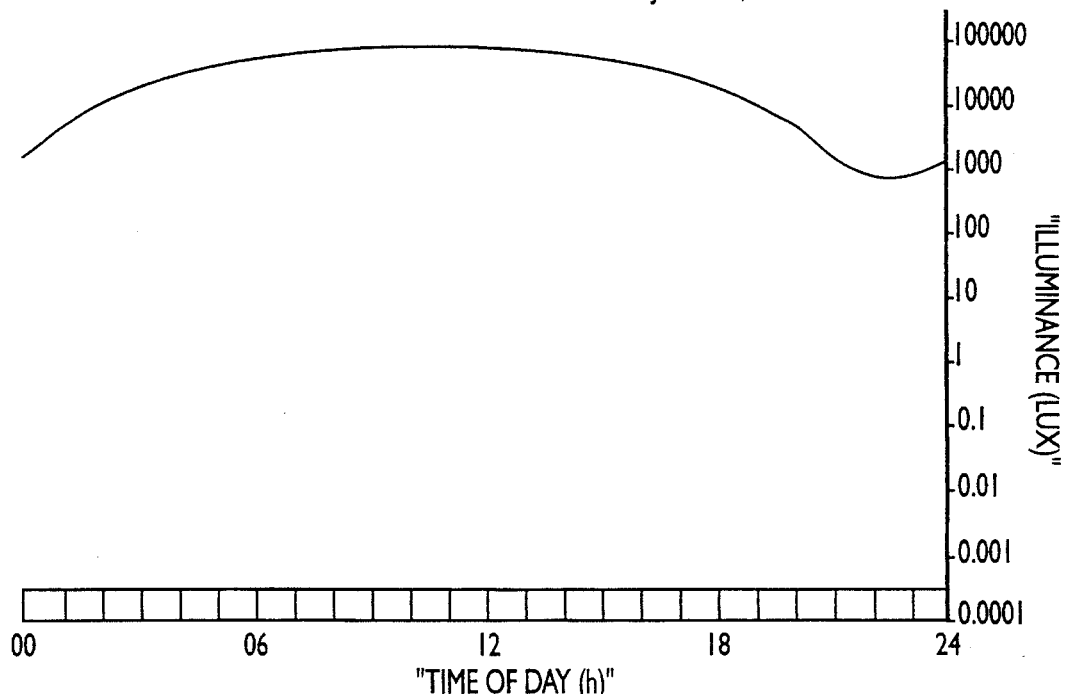
Figures 5, 7C:
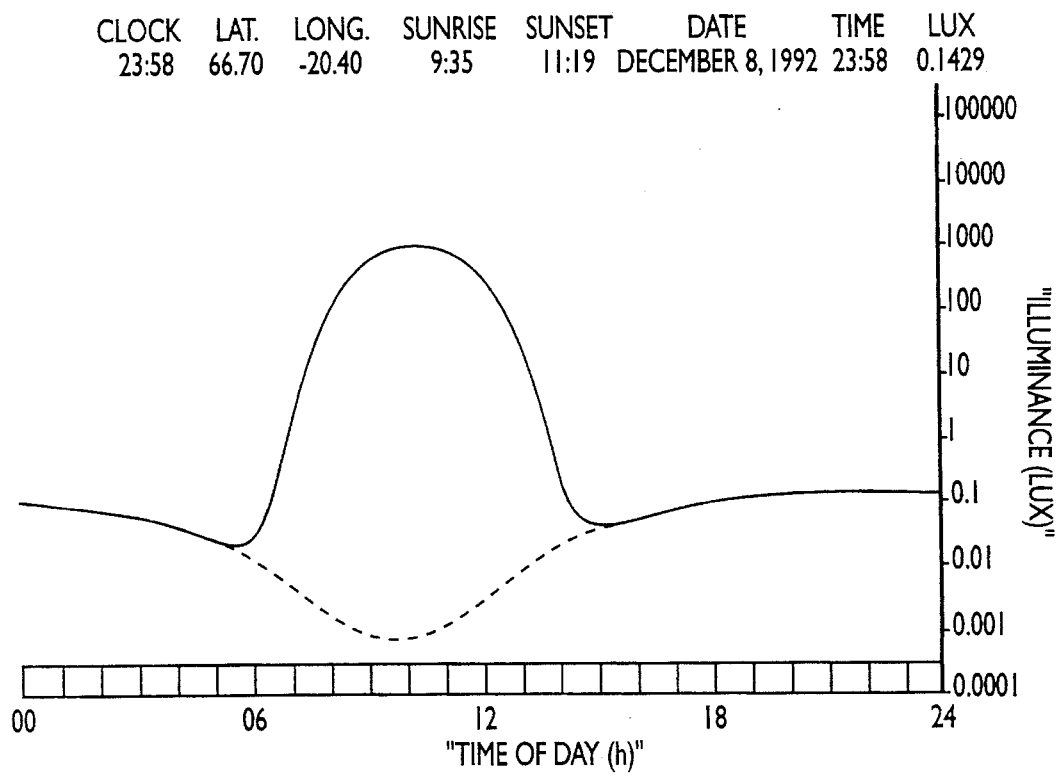
Figures 6, 7C:
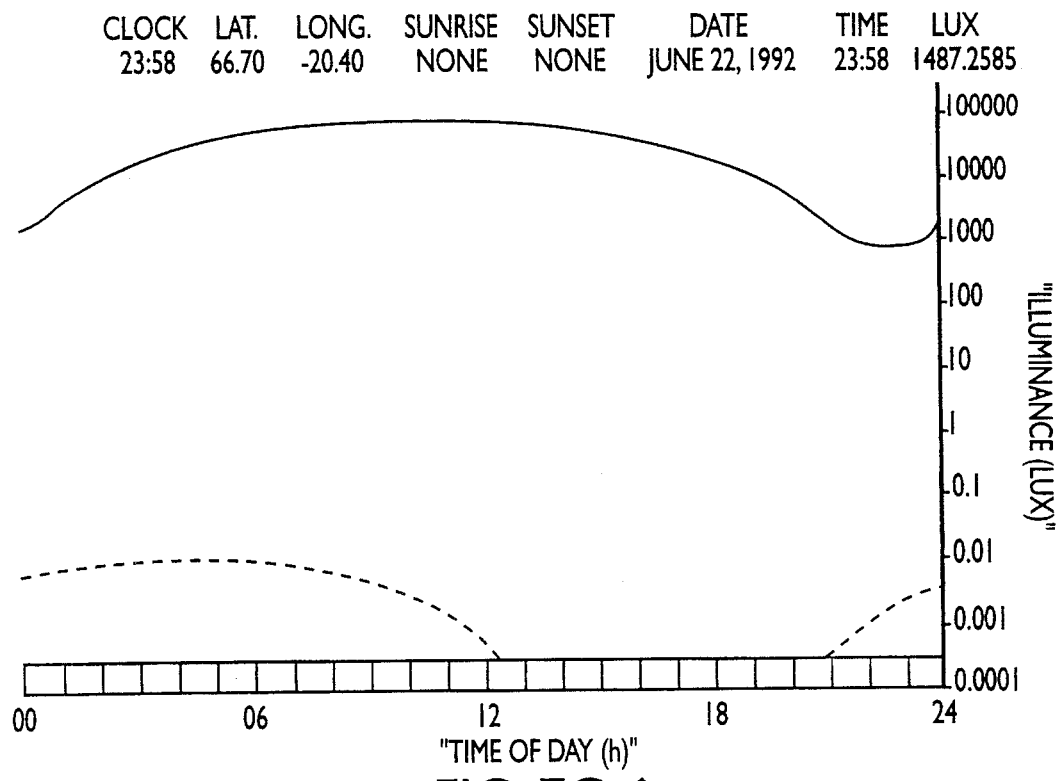
Figures 1, 7D:
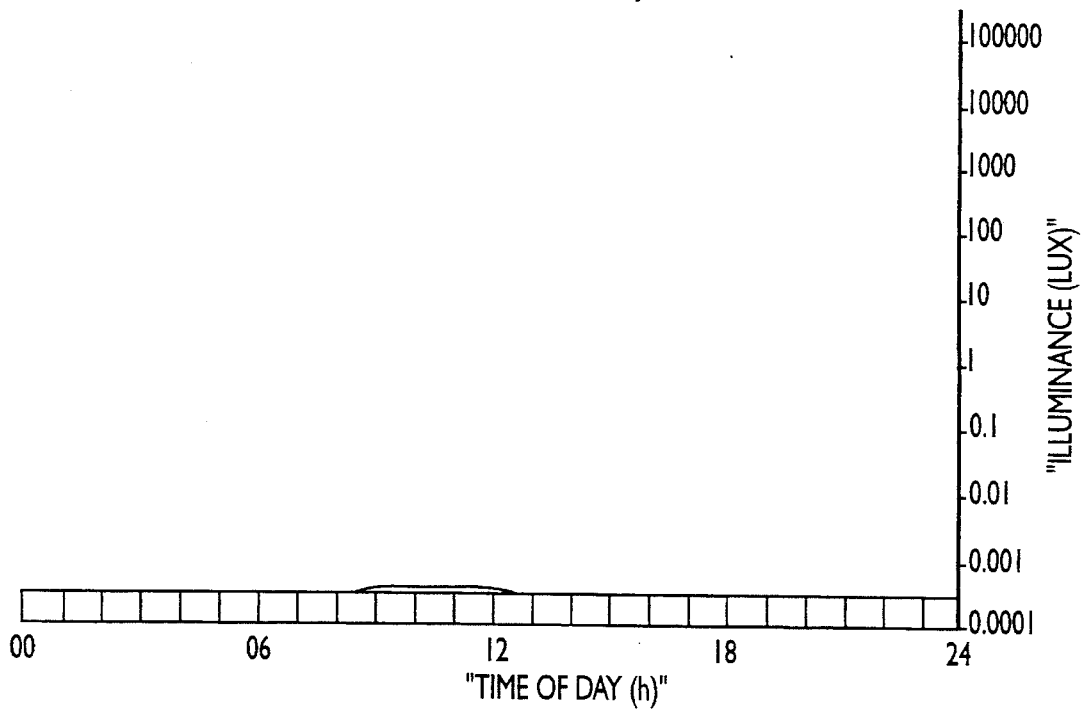
Figures 2, 7D:
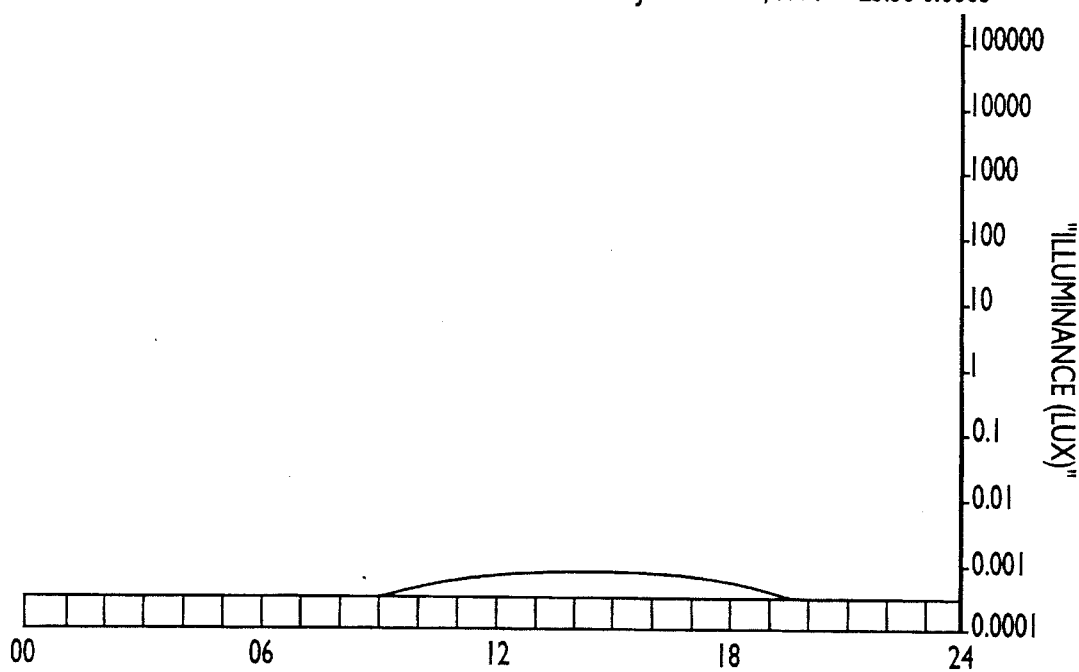
Figures 3, 7D:
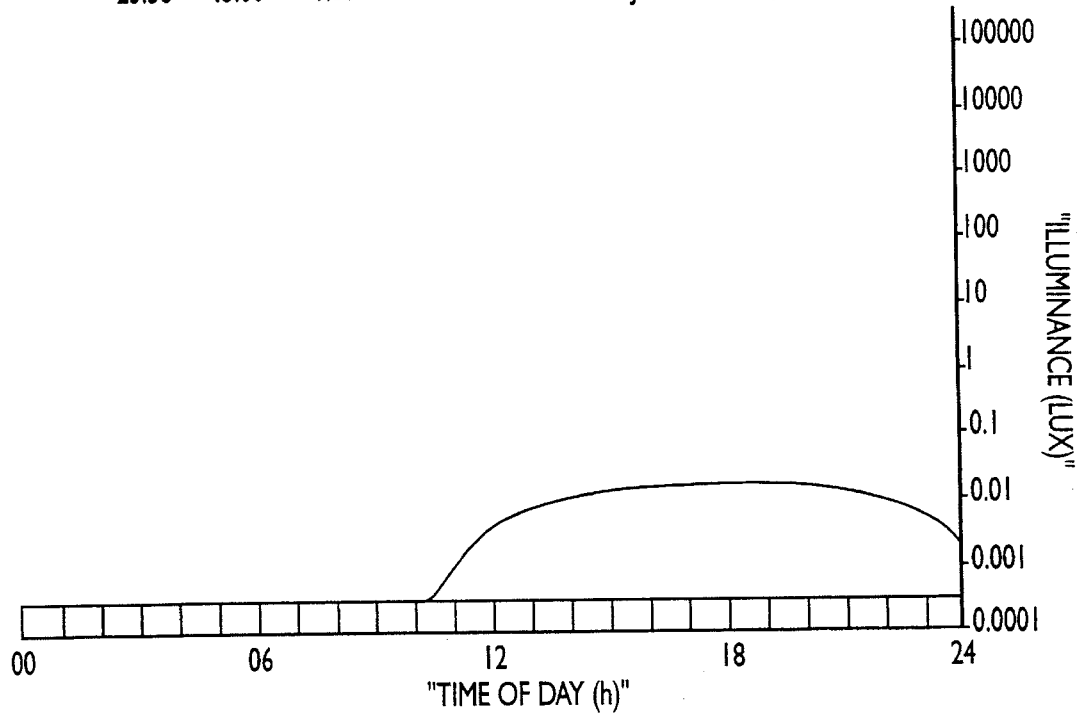
Figures 4, 7D:
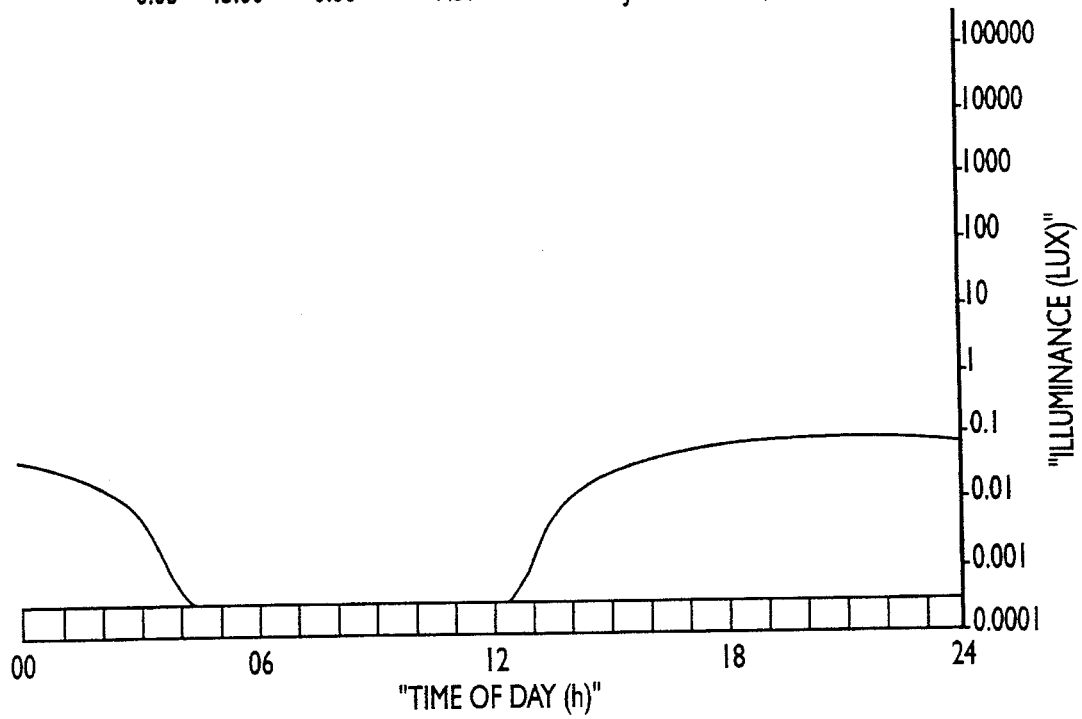
Figures 5, 7D:
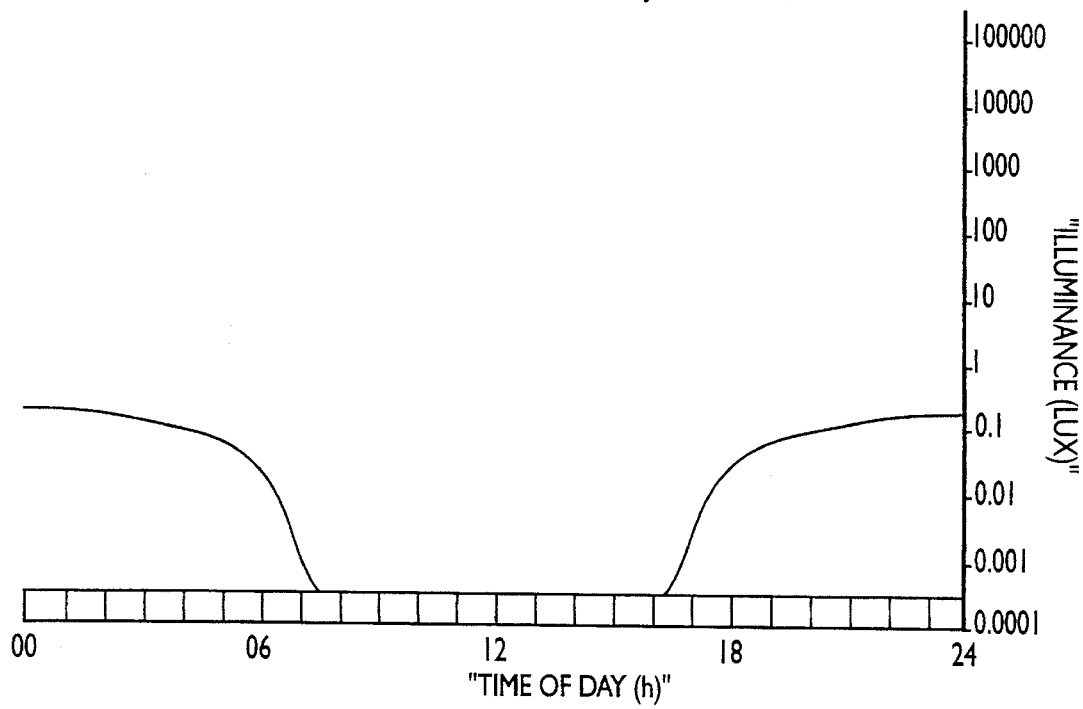
Figures 6, 7D:
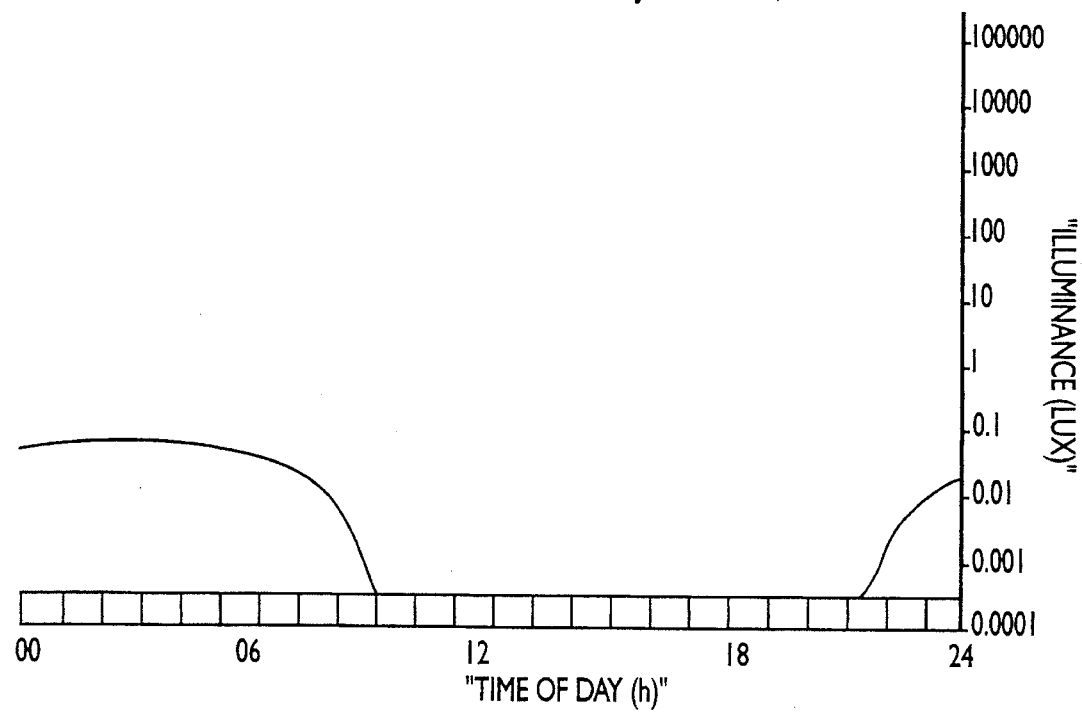
Figures 7, 7D:
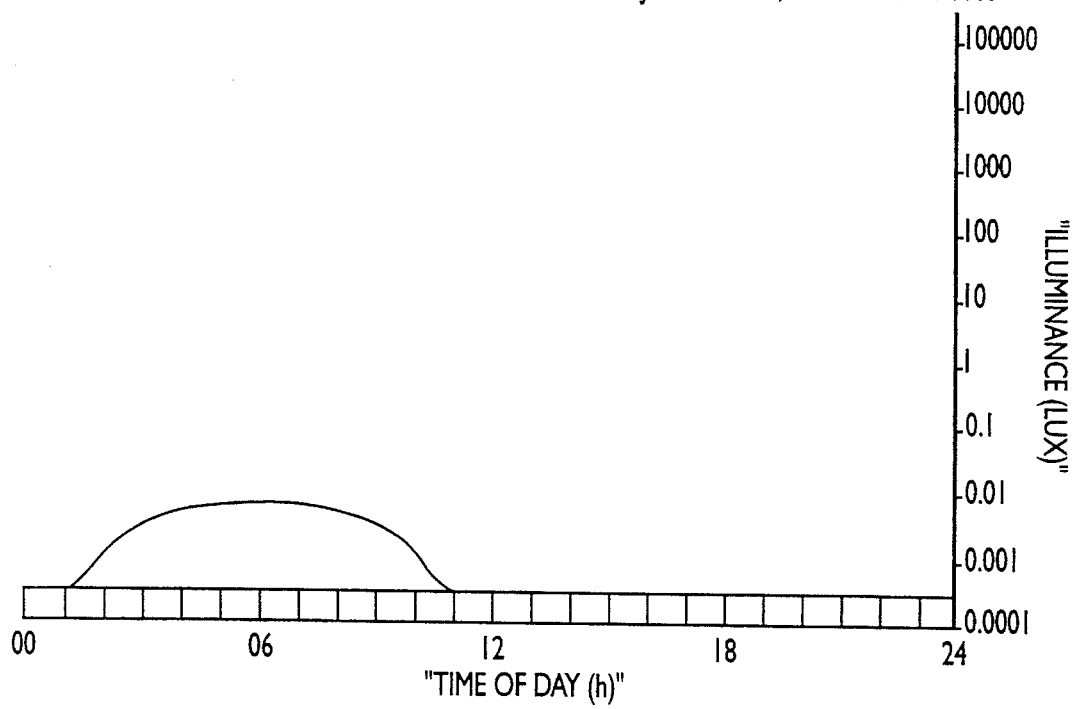
Figures 7, 7D, 8:
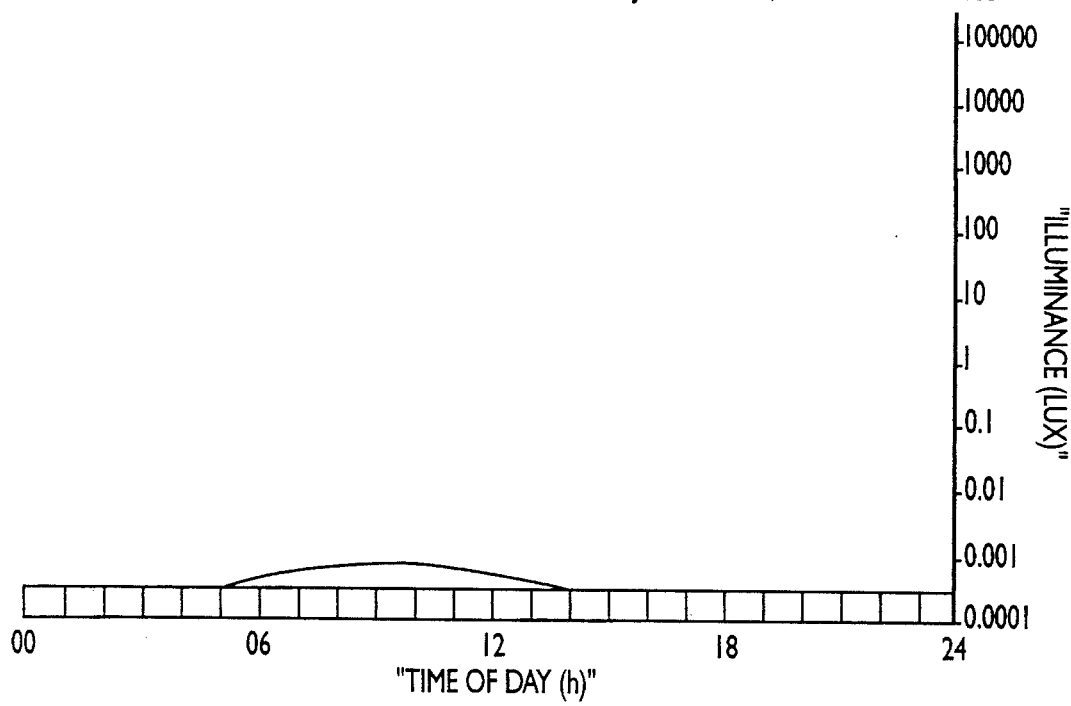
FIG. 8 is a block diagram for the system.
Figure 8:
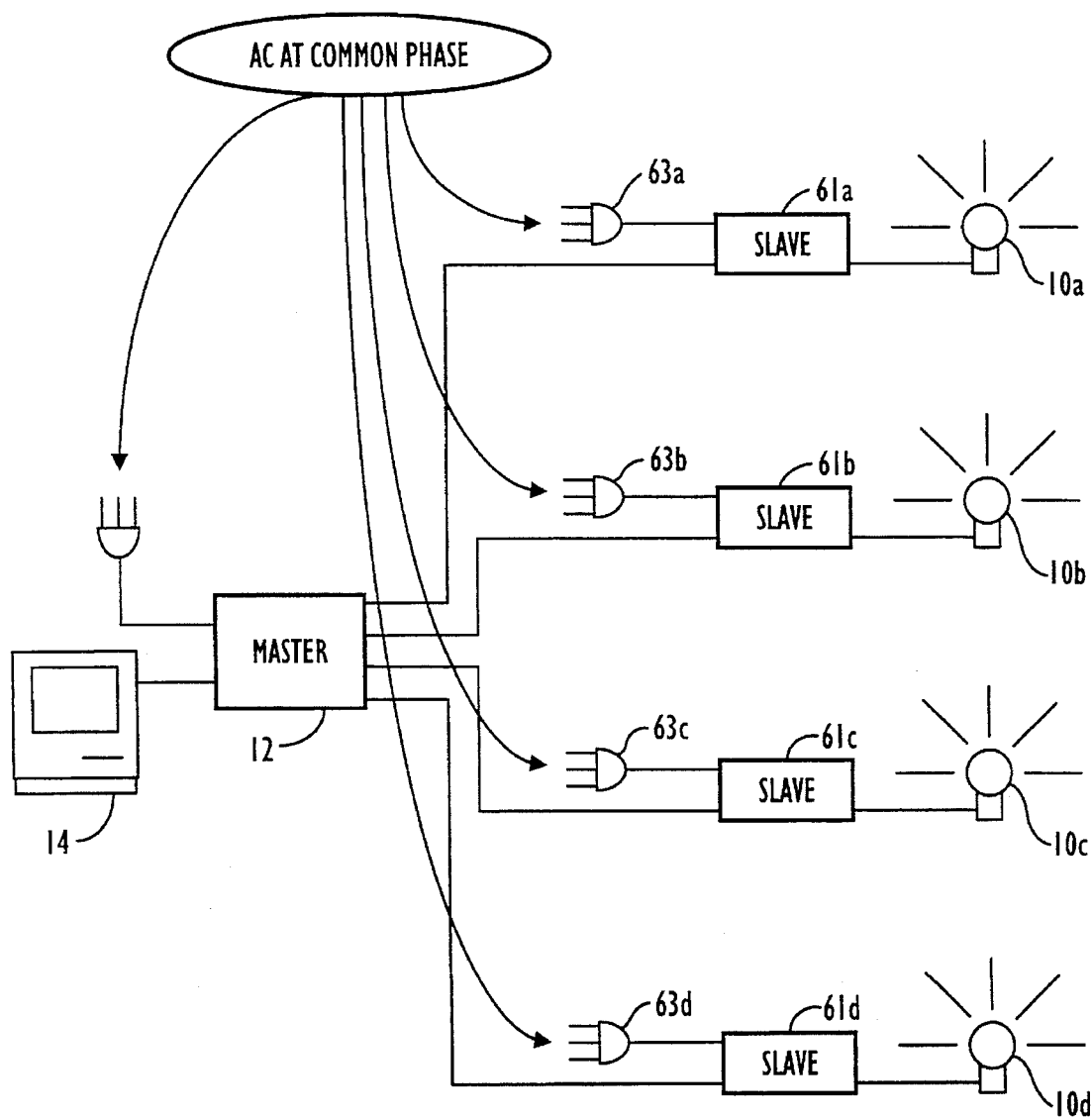
Figure 9A:
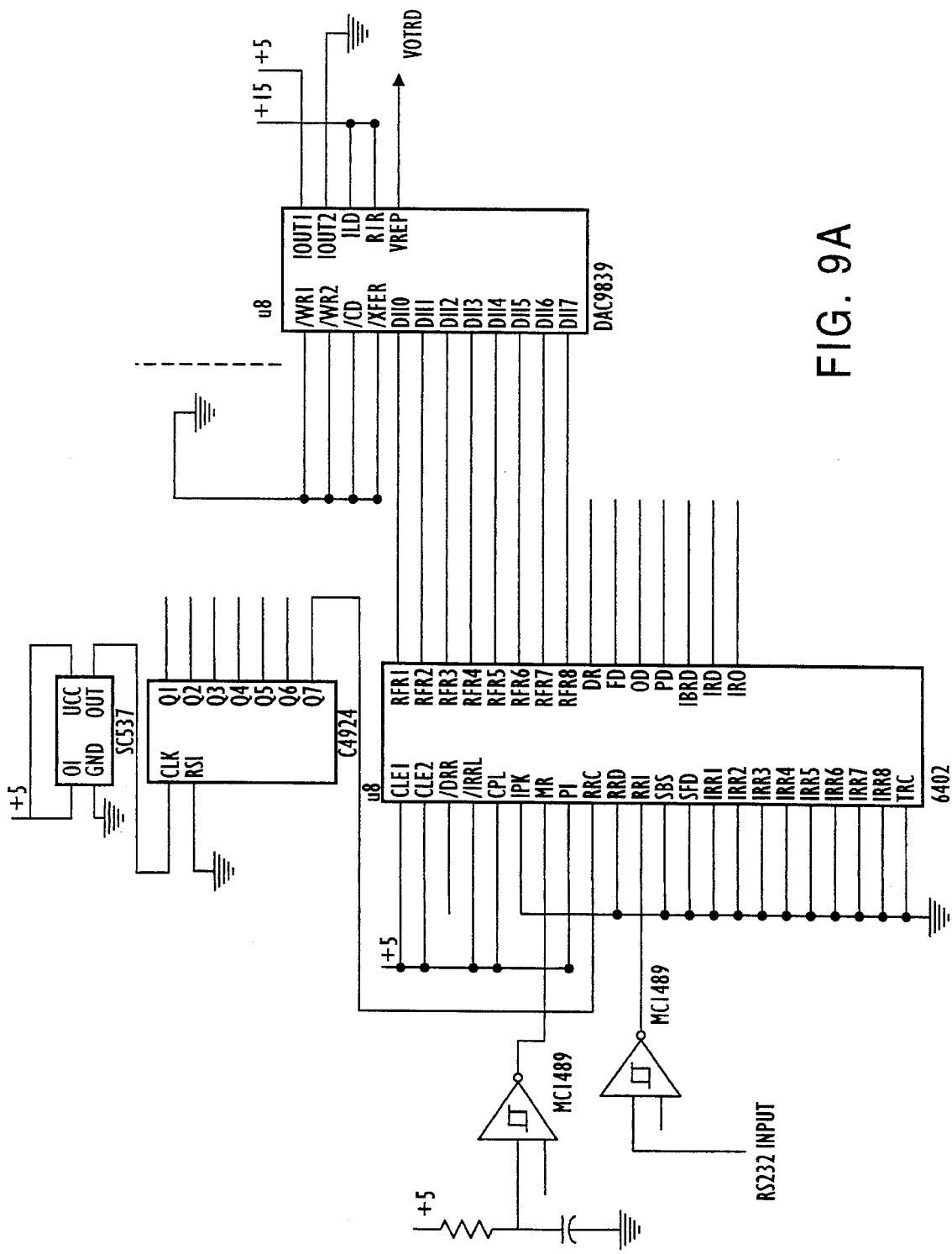
FIGS. 9A–9D are block diagrams for the master and slave units.
Figure 9B:
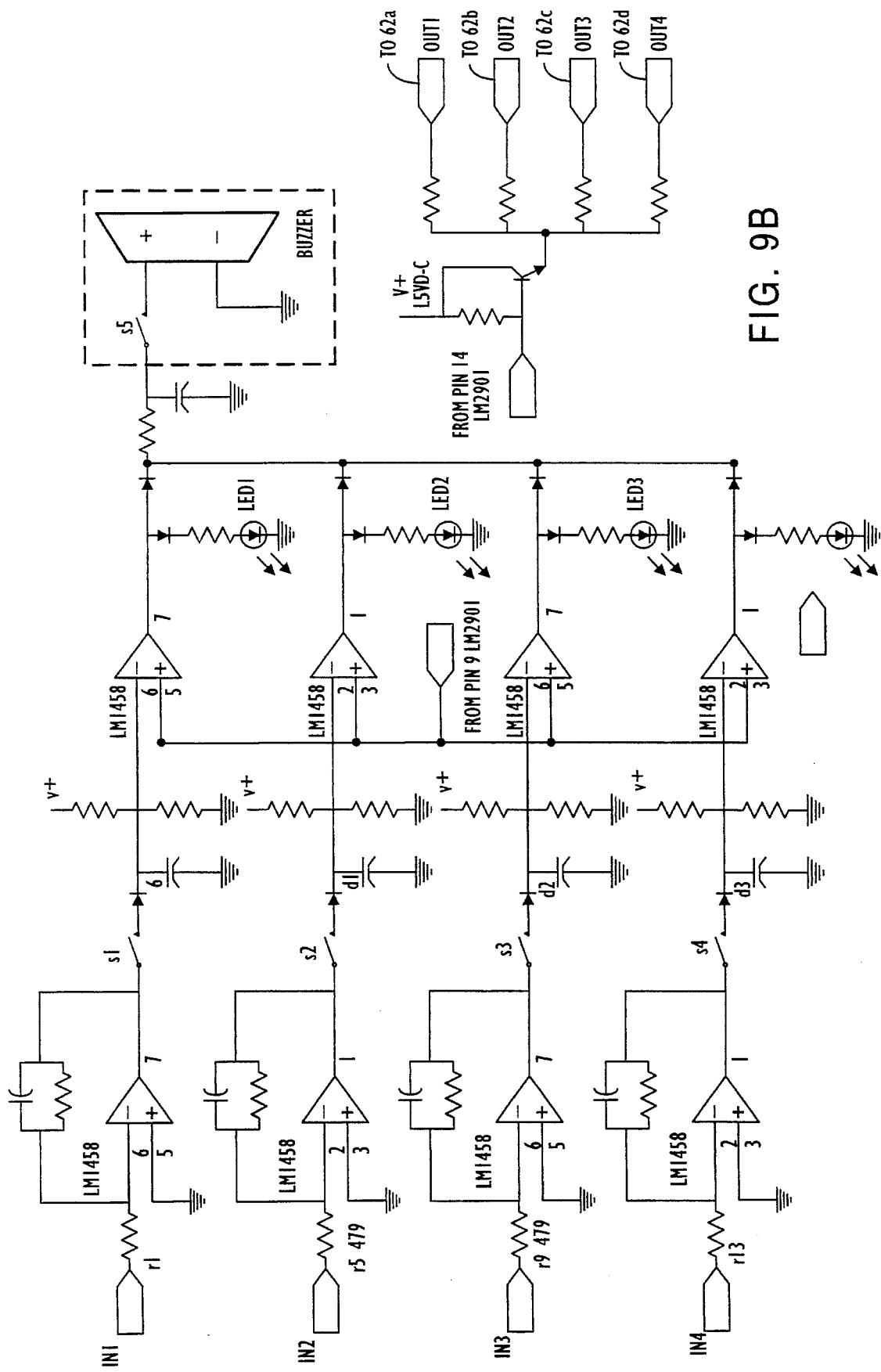
Figure 9C:
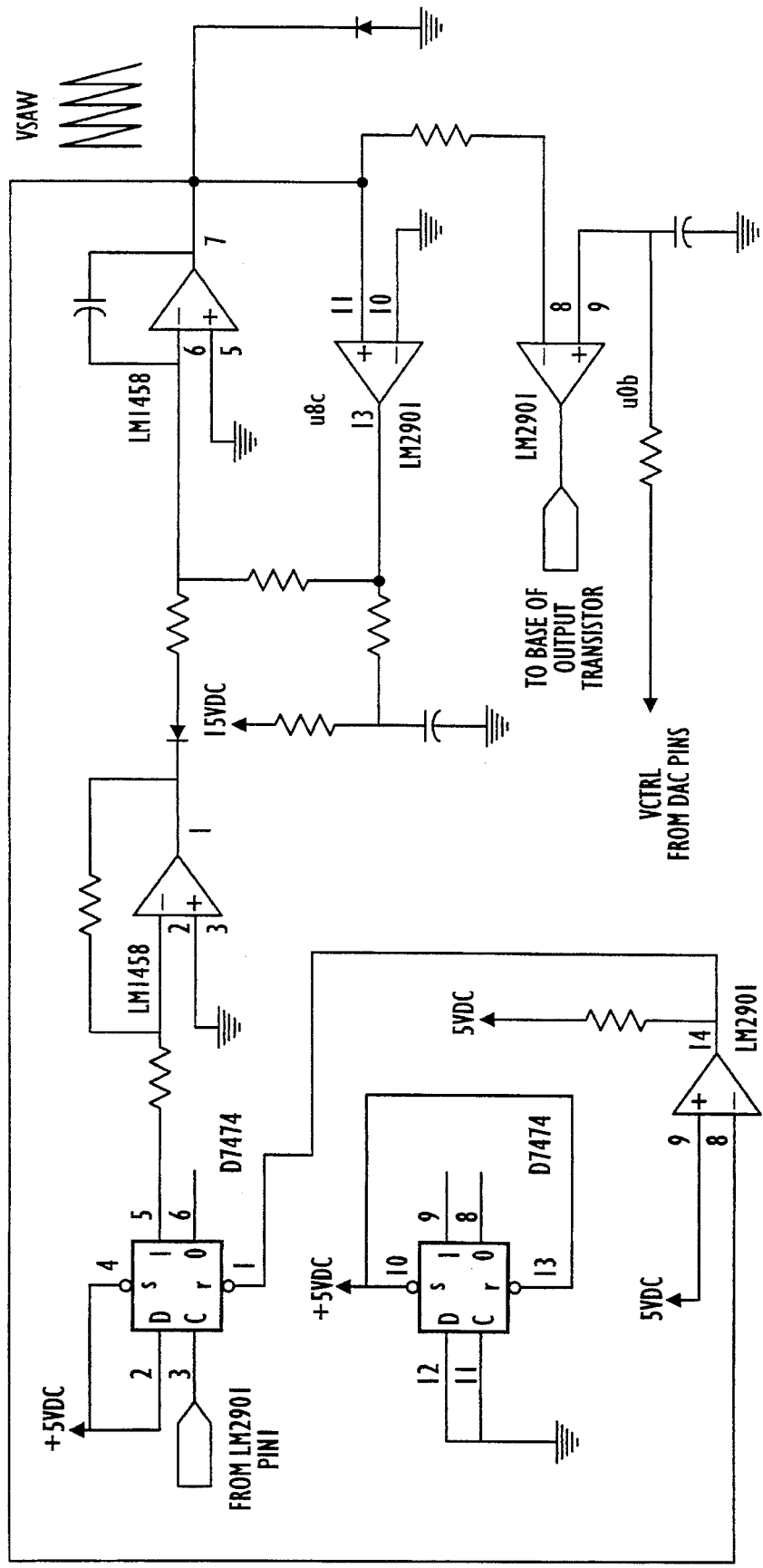
Figure 9D:
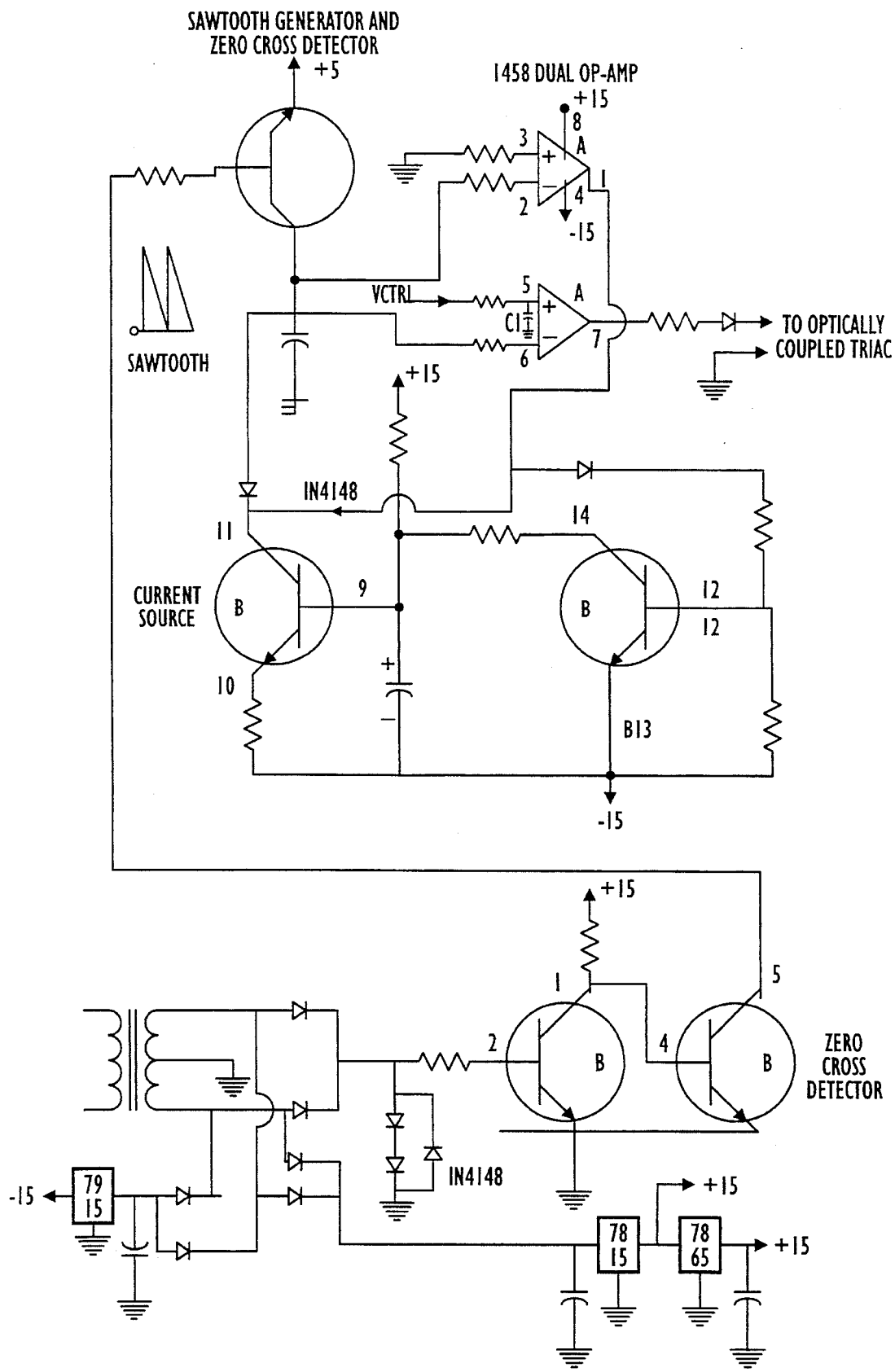

FIGS. 7A–7D illustrate, by means of Macintosh™ computer screen dumps, a range of output functions obtained under the Run Mode, expressed as graphic outputs. In all cases, a 24-hr time span is represented across the abscissa. Illuminance levels, on a logarithmic scale, are expressed on the ordinate, spanning the starlight (ca. 0.0001 lux) through midday sunlight (ca. 100,000 lux) levels. In practice, lamps delivering the corresponding signals would achieve maximum output 1–2 orders of magnitude lower than that specified by the algorithm for midday light, thus providing maximum illuminance of approximately 1,000 to 10,000 lux. FIG. 7A shows simulations at equator for daylight alone, daylight+moonlight, a skeleton photoperiod reduction of daylight, and moonlight alone. FIG. 7B shows continuous daylight functions and matched skeleton photoperiod reductions, at 45 deg N lat at the winter solstice, vernal equinox and summer solstice. FIG. 7C compares winter and summer solstice illumination patterns at the arctic circle [continuous daylight, skeleton photoperiod reduction (available only in the winter), and daylight+moonlight]. FIG. 7D shows the progression of lunar-illumination (as determined by variations in lunar phase) across a monthly cycle beginning in January 1992.

Under the Run Mode, there are two ancillary modes which may be utilized during a run, for the purpose of adjustment of illumination level at the target surface, as described below.

A. LAMP TEST MODE: This option takes temporary control of light output from the simulation program in order to test lamp operation, without interrupting the progression of the simulation program in the background. The user selects a particular nominal light output level (for example, "sunrise"=1000 lux), which is then delivered as a constant test signal. This feature is used for positioning the lamp relative to the illuminated surface in order to obtain a desired illuminance level (as measured by a photometer). The resulting illumination cycle is then proportionally anchored to the user's particular spatial arrangement of light source and illuminated surface (for example, "sunrise"=500 lux or 1000 lux). As an alternative strategy, the user could specify the maximum illumination level to be presented as moonlight at the phase of the full moon (for example, 0.2 lux), and the entire illumination range of the system, including the daylight component, would be proportionately re-scaled. (Lamp testing can also be performed prior to initializing the simulation program.)

B. FEEDBACK PHOTOMETRY MODE: For precision control of momentary illuminance in critical applications (for example, photobiology research), supports a serial port input line from a sensitive digital photometer whose sensor is placed at the illuminated surface, or at a known distance from such surface. The program continually samples the obtained illuminance levels and compares them with those specified by the algorithm. Lamp output is dynamically adjusted for optimum agreement of the reference and transmitted levels.

III. LAMP CALIBRATION MODE

An incandescent lamp is positioned in a darkroom, and turned on to full intensity (digital output driver set at 255). The photometer sensor is placed at a position corresponding to the maximum desired illuminance or irradiance in a given operational setting (for example, 3,000 lux). In order to map a range of intensities spanning naturalistic nighttime levels through low day-time levels (approx. 7 log units) the photometer is capable of reliable measurements as low as approximately 0.001 lux. For automated calibration, a digital output photometer is used within a program which gradually steps the input voltage from zero to maximum in 255 steps. At each step multiple measurements are taken until a stable reading is achieved, allowing accommodation of the lamp filament.

A text file is assembled of correspondences between the digital output integer code (0–255) and resultant illuminance levels. If irradiance measurements are taken (for example, dB mW), use of a photometric filter allows conversion to illuminance (for example, dB lux. or ft-C). (For manual calibration, the user can step the output signal throughout its dynamic range and type in resultant illuminance levels.) An empirical function is thus generated which is fitted by a 5th order polynomial function in the form $$y=a+bx+cx^2+dx^3+ex^4+fx^5,$$

where y is in log kLux and x is the digit sent (see Appendix E).

In Run Mode, the program specifies desired momentary illuminance levels and outputs the integer 0–255 specified by the polynomial function. For pre-calibrated lamps, the five exponential constants are built into the program, and the user simply selects the lamp type (for example, halogen or standard incandescent). For user-calibrated lamps, the user must define a new lamp type and install these five constants in a parameter list. Lamps also can be periodically re-calibrated to compensate for aging of filament. It is important to emphasize that this strategy succeeds in precisely determining light levels received at a surface throughout the working range of a lamp, in marked contrast to previous technology which specifies voltage imposed upon a lamp without knowledge of the resulting (complex) illuminance function as such voltage is varied.

IV. THE MARDWARE

The hardware (FIG. 8) includes a master interface unit 12 connected to and controlled by the computer 14. A number, such as four, of slave units 61 and cabling to connect the computer to the master and the master to the master to the slaves. Each slave unit 61a–d controls a respective lamp 10a–c. Each slave can drive one or more lamps, for example, up to 10 amps per slave. Each unit connects to AC power via a standard IEC connector 63.

The system, whose details are shown in FIGS. 9A–9D, can produce any of 256 current outputs, including fully off and fully on. If incandescent lamps are used, it is normal, depending on lamp type, for the first few levels (e.g., 30) to be below the glow point of the filaments. When changing from one current output setting to another, the system "glides" between the two, making a smooth transition rather than a step.

The master contains an alarm unit which monitors the current output of each slave, and will sound an alert if any slave operates with no load because lamps burn out or are unplugged. An indicator light will show which of the four channels has a problem. The master 10, whose details are shown in FIGS. 9A–9D connects to the computer through a standard RS-232 port modem cable. The slaves 62 should be placed in accessible locations near the lamps they drive, so as to avoid long stretches of high-voltage AC transmission. The slaves connect to the master through cables with suitable connectors.

The lamps for producing the variable illumination level plug into the slaves. Any type of incandescent (standard or halogen) drawing up to the current limit of each slave can be used. It is preferred that the lighting should be indirect, or diffused through a diffusing screen. With halogen lamps, the UV component should be filtered. If multiple lamps are to be driven by a single slave, there are two possibilities. If the lamps are operated in parallel, the total current will be the sum of the currents and the burnt lamp detector will operate only when all lamps fail. If the lamps are operated in series wired to a single plug (e.g., ten 12 v lamps on a 120 v power source), then the total current will equal the current in each lamp and the burnt-lamp detector will operate if any bulb burns out.

The lamp-driver interface allows a control number (for example, 0–255 in an 8-bit system) to set the firing angle of a TRIAC (or back-back SCRs), thus determining the RMS value of the lamp output voltage. The circuit has the following special advantages.

(1) The relation between digital output and lamp voltage output is almost completely independent of the tolerances of all components other than the DAC (digital-to-analog converter) used. All units therefore behave similarly with respect to light levels obtained from a given lamp, and are not affected by temperature, humidity, or even long-term aging of components.

(2) Extremely high accuracy and repeatability are achieved at low cost. Even the usually required precision voltage references for DAC systems is eliminated.

(3) No end-point trimming is required at the low end to insure that digital zero corresponds to zero lamp voltage output.

(4) No end-point trimming is required on the high end to insure that the highest digital input corresponds to the highest output.

(5) Lamp output voltage glides smoothly from one digital input to the next.

(6) The circuit detects if a lamp filament has failed. In one example implementation, each master unit drives up to four slave TRIAC units. Each slave unit monitors current output by means of a current transformer—a sensing coil magnetically coupled to a straight wire passing through its center. This sensing method allows monitoring of lamp current without introducing any voltage drop (and thus affecting lamp output, however subtly). The circuit in the master unit, which decides when to report an open filament, also examines the control voltage from the DAC (which set lamp intensity) so that absence of lamp current does not register as a fault when no lamp current is requested. No trimming adjustment are needed in this circuit. Lamp failure is indicated by an LED (one for each slave) and one shared audio alarm with disable switch. In one example configuration, LEDs and alarm are located on panel of the master unit.

(7) Failure of the TRIAC or optical coupler in a slave does not affect the operation of the master or other slaves, thus preserving the integrity of individual lamp outputs.

The circuit utilizes a ramp generator whose output, in one example configuration, ramps downward from voltage A (for example, 5 volts) to voltage B (for example, 0 volts), and then jumps back up, that is, rises rapidly to voltage A. This action is synchronized with the AC power line by means of a zero-crossing detector, so that the period of the ramp is one half the period of the AC power (for example, ramp period=1/120 sec for 60 Hz power lines). Ramp voltage is continuously compared with DAC output voltage, after smoothing by an RC filter, and the TRIAC is switched on (via an optical coupler) when DAC voltage exceeds decreasing ramp voltage. Special features of circuit implementation include the following:

(1) The rapid rise to voltage A is achieved by switching a large current into an integrator. This rise is terminated at voltage A by a voltage comparator.

(2) The ramp to voltage B is achieved by switching a smaller current of opposite sign into the integrator. This current comes from a variable current source whose value is set by feedback, so that the ramp reaches voltage B at the same time at which the ramp period ends. If the ramp reaches voltage B at an earlier time, the current source is set lower by the circuit; otherwise, the current source is set slightly higher by the circuit.

(3) In an example configuration, Voltage B is taken as zero, for reasons of simplicity. It is accurately reached by comparing output voltage with ground.

(4) In an example configuration, voltage A and the DAC reference voltage are both taken from the nominal 5 volt power supply line. No error is introduced by the supply line tolerance because the ramp voltage is compared to the DAC voltage. In this way, the need for a precision voltage reference is eliminated.

(5) If desired, an RMS responsive integrated circuit chip can be added to the circuit to compensate for line voltage changes. One way to use such a chip is to have the circuit vary TRIAC firing angle until the RMS value of the lamp output voltage (properly scaled) matches that of the filtered DAC output.

We claim:

1. A naturalistic illumination system for a user at a location comprising:

a light source for providing illumination of variable intensity above a non-zero value to said user location;

means including a computer having an input device for producing a variable signal to control a cycle of variable intensity illumination level output of said light source to correspond to the progressive variation in light level intensity above a non-zero value over a selected time of day period at a selected geographical location as selected from said input device, said signal producing means operating on a daily basis to produce the variable intensity illumination cycle for the same period of time and including means for progressively shifting the time of the start of the production of the variable intensity illumination cycle for said period of time each day over a period of successive days relative to the normal time of start of the production of the variable intensity illumination cycle during said period of successive days at said selected geographical location.

2. A system as in claim 1 wherein said variable signal producing means controls the time and ending of the period of the variable intensity illumination cycle to be the same for a first group of days and thereafter is advanced for a second group of days.

3. A naturalistic illumination system for a user at a location comprising:

a light source for providing illumination of a variable intensity output above a non-zero level to said user location;

a computer including an input device for producing a variable signal to control the illumination level output intensity of said light source on a progressive basis corresponding to a sleep cycle of a transition from daylight to dusk, a night period during which sleep is to occur, and a transition from night to dawn corresponding to a geographic reference and time as set by said input device; and said computer including means for selectively changing the illumination level output intensity of said light source during only at least one of the periods of daylight to dusk transition and night to dawn transition of the sleep cycle.

4. A system as in claim 3 wherein said means for selectively changing operates said variable signal producing means to prevent the production of a control signal for the daylight to dusk transition portion of the sleep cycle.

5. A system as in claim 3 wherein said means for selectively changing operates said variable signal producing means to prevent the production of a control signal for the night to dawn transition portion of the sleep cycle.

6. A naturalistic illumination system for a user at a location comprising:

a light source for providing illumination of a variable intensity output level above a non-zero value to said user location;

a computer having an input device for producing a variable signal to control and progressively change the variable intensity illumination level output of said light source to correspond to a sleep cycle as selected from said input device of a transition from daylight to dusk, a night period during which sleep is to occur, and a transition from night to dawn, said computer input device including means for selecting a desired night period of the sleep cycle and time of onset of said night period, said computer setting and operating said variable signal producing means to produce a variable signal for the sleep cycle at a geographical location and time of year that corresponds to the selected night period and time of night period onset of the sleep cycle.

7. A naturalistic illumination system as in claim 6 further comprising alarm means for indicating the onset of at least one of the daylight to dusk and night to dawn transitions of the sleep cycle.

8. A naturalistic illumination system as in claim 3 wherein said means for selectively changing attenuates the illumination level output of said light source.

9. A naturalistic illumination system as in claim 3 wherein said means for selectively changing compresses the normal time of at least one of the periods of daylight to dusk and night to dawn transitions.

10. A naturalistic illumination system for a user at a location comprising:

a light source for providing illumination of a variable intensity output level to said user location;

a computer for producing a variable signal to control the illumination level output of said light source corresponding to a sleep cycle of a transition from daylight to dusk, a night period during which sleep is to occur, and a transition from night to dawn at a geographical reference location over a sequence of successive days to produce a normal daily progression of changing starting times of the sleep cycle for said geographical reference location; and said computer including means to operate said variable control means to skip one or more days of the sequence to accelerate the change in sleep cycle starting time from the normal daily progression.

11. A naturalistic illumination system comprising:

a light source for providing illumination of a variable intensity output level above a non-zero value;

a computer having an input device for producing a variable signal to control the illumination level output intensity of said light source corresponding to a sleep cycle of a transition from daylight to dusk, a night period during which sleep is to occur, and a transition from night to dawn at different geographical reference locations located between first and second geographical locations as selected from said input device; and said computer over a predetermined sequence of successive days in relation to said selected first and second geographical locations producing a normal daily progression of variable signals to control the variable level illumination output intensity of said light source for changing sleep cycles corresponding to different geographical locations between said selected first and second predetermined geographical locations over said predetermined sequence of successive days.

12. An illumination system for a user at a location comprising:

a light source for providing a variable intensity illumination output above a non-zero level to said user location;

means including a computer having an input device for producing a variable signal to control the variable intensity illumination level output of said light source to correspond to a selected time of day at a selected geographical location, said computer input device utilized by the user to select two different geographical locations and a predetermined time period for travelling between said two different geographical locations and in response thereto said computer progressively changing said variable output signal to produce a variable intensity illumination level from said light source that corresponds to the changing illumination level over the travel path between said two selected different geographical locations over said predetermined time period.

13. A naturalistic illumination system for a user at a location comprising:

a light source for providing illumination of a variable intensity output level above a non-zero value to said user location;

a computer including an input device for producing a variable signal to control the illumination level output intensity of said light source corresponding to a sleep cycle of a transition from daylight to dusk, a night period during which sleep is to occur, and a transition from night to dawn corresponding to a selected geographic reference location and time set through said input device, the cycle changing over successive days; and said computer including means to repeat on successive days said daylight to dusk and night to dawn transitions for the selected geographical reference location.

14. The system of claim 13 wherein said computer further includes means to selectively adjust the duration of the night period relative to the daylight to dusk and night to dawn transitions.

15. A naturalistic illumination system for a user at a location comprising:

a light source for providing illumination of a variable intensity output level above a non-zero value to said user location;

a computer including an input device for producing a variable signal to control the illumination level output intensity of said light source corresponding to a cycle over a duration of time that includes a transition from daylight to dusk, a night period during which sleep is to occur, a transition from night to dawn and a normal daylight period at a geographical reference location over a sequence of successive days as selected through said input device to produce a normal daily progression of changing sleep cycles; and said computer including means to selectively vary said different periods of said cycle.

16. A naturalistic illumination system for a user at a location comprising:

a light source for providing illumination of a variable intensity above a non-zero value to said user location;

computer means including an input device for producing a variable signal to control the illumination level output of said light source to correspond with a selected time period of a day at a selected geographical reference as selected from said input device, wherein said light source comprises a plurality of lights, means responsive to said variable signal for controlling the output illumination of said plurality of lights including a master control unit for receiving said variable signal and a slave unit for each light which is connected to be controlled by said master unit to vary the output intensity of the light associated with a slave unit.

17. A system as in claim 16 wherein said means for controlling operates in response to said variable signal to produce a plurality of values in steps which are digitally related to the value of the variable control signal.

18. A system as in claim 17 wherein said controlling means further comprises means to control the amount of current supplied to a lamp at a slave unit to control its output illumination intensity.

* * * * *

UNITED STATES PATENT AND TRADEMARK OFFICE
CERTIFICATE OF CORRECTION

PATENT NO. : 5,589,741
DATED : December 31, 1996
INVENTOR(S) : Michael Terman, et al It is certified that error appears in the above-indentified patent and that said Letters Patent is hereby corrected as shown below:

Column 8:

| LINE | | SHOULD READ |
|---|---|---|
| 26 | ST-to-DST | DST-to-ST |
| 28 | DST-to-ST | ST-to-DST |
| 34 | DST-to-ST | ST-to-DST |
| 53 | ST to DST | DST to ST |
| 58 | DST to ST | ST to DST |

Signed and Sealed this

Sixteenth Day of September, 1997

Attest:

BRUCE LEHMAN

Attesting Officer     Commissioner of Patents and Trademarks